(12) United States Patent
Canorro et al.

(10) Patent No.: US 6,586,520 B1
(45) Date of Patent: Jul. 1, 2003

(54) COMPOSITIONS FOR IMPARTING DESIRED PROPERTIES TO MATERIALS

(75) Inventors: James Canorro, East Syracuse, NY (US); Robert A. Gelman, Newark, DE (US); Matthew B. Howle, Hockessin, DE (US); Andrea Keys, Bensalem, PA (US); JoAnne Lefever, Lancaster, PA (US); William W. Maslanka, Landenburg, PA (US); Jeffrey I. Melzer, Lansdale, PA (US); Kevin M. Mottern, Midland, PA (US); Michael T. Raab, Langhorne, PA (US); William Rodriquez, Newark, DE (US); Richard A. Stuhrke, Wilmington, DE (US); Jennifer E. Steed, Pensacola, FL (US); Robert G. Szewczyk, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/613,529

(22) Filed: Jul. 10, 2000

Related U.S. Application Data

(63) Continuation-in-part of application No. 09/348,346, filed on Jul. 8, 1999, now abandoned.

(51) Int. Cl.[7] .......................... C08L 77/06; C08L 31/04; C08L 33/00
(52) U.S. Cl. ...................... 524/514; 524/502; 524/503; 524/517; 524/519; 524/521; 524/522; 524/523; 524/524; 524/527
(58) Field of Search ................. 524/514, 502, 524/503, 517, 519, 521, 522, 523, 524, 527

(56) References Cited

U.S. PATENT DOCUMENTS

| | | | |
|---|---|---|---|
| 2,926,116 A | 2/1960 | Keim | |
| 2,926,154 A | 2/1960 | Keim | |
| 3,714,298 A | 1/1973 | Bergomi, Jr. | |
| 4,049,607 A | 9/1977 | Berghoff | |
| 4,323,490 A * | 4/1982 | Töpfl | 523/409 |
| 4,381,294 A | 4/1983 | Bouillon et al. | |
| 4,420,530 A | 12/1983 | Toyoda et al. | |
| 4,571,412 A * | 2/1986 | Minamida et al. | 524/64 |
| 4,594,108 A | 6/1986 | Greminger, Jr. et al. | |
| 4,673,702 A | 6/1987 | Iacoviello | |
| 4,702,947 A | 10/1987 | Pall et al. | |
| 4,710,374 A * | 12/1987 | Grollier et al. | 424/61 |
| 4,789,430 A * | 12/1988 | Fredenucci | 162/145 |
| 4,841,008 A | 6/1989 | Tsukamoto et al. | |
| 4,859,527 A | 8/1989 | Distefano | |
| 4,962,141 A | 10/1990 | Iacoviello et al. | |
| 4,963,603 A | 10/1990 | Felegi, Jr. et al. | 524/13 |
| 5,109,053 A | 4/1992 | Smith et al. | 524/514 |
| 5,137,633 A | 8/1992 | Wang | |
| 5,219,914 A | 6/1993 | Warburton, Jr. | 524/501 |
| 5,314,945 A | 5/1994 | Nickle et al. | 524/507 |
| 5,387,638 A | 2/1995 | Nakamae et al. | 524/503 |
| 5,397,646 A | 3/1995 | Nickle et al. | 428/423.1 |
| 5,439,010 A | 8/1995 | Ross | 131/332 |
| 5,614,597 A | 3/1997 | Bower | 525/430 |
| 5,644,021 A | 7/1997 | Maslanka | 528/336 |
| 5,668,246 A | 9/1997 | Maslanka | 528/336 |
| 5,698,305 A | 12/1997 | Suzuki et al. | 428/219 |
| 5,718,756 A | 2/1998 | Mohler | 106/486 |

FOREIGN PATENT DOCUMENTS

| | | |
|---|---|---|
| EP | 0579081 | 1/1994 |
| EP | 0606005 | 7/1994 |
| WO | 99/14278 | 3/1999 |

* cited by examiner

*Primary Examiner*—Ana Woodward
(74) *Attorney, Agent, or Firm*—Gary A. Samuels

(57) ABSTRACT

The present invention relates to aqueous compositions comprising component (A) which comprises at least one water-soluble component comprising at least one functional group that undergoes a crosslinking reaction, preferably upon drying and/or heating; and component (B) which comprises at least one film-forming material. In particular the composition is a coating composition comprises: (A) at least one polyamidoamine-epihalohydrin resin; and (B) at least one material selected from flexibilizing materials, crosslink inhibiters and combinations thereof in an amount sufficient to impart a cuttability value of less than about 15 to a substrate coated with the coating composition. Component (B) is preferably at least one polymer comprising repeating units derived from an alkyl halide having at least one double bond and an alkene, such as ethylene vinyl chloride. Coated substrates such as coated building units, such as ceiling tiles and wall boards, as well as methods of producing such coated substrates are also provided.

3 Claims, No Drawings

COMPOSITIONS FOR IMPARTING DESIRED PROPERTIES TO MATERIALS

CROSS-REFERENCE TO RELATED APPLICATION

The present application is a continuation-in-part of U.S. application Ser. No. 09/348,346 filed Jul. 8, 1999, now abandoned the entire disclosure of which is expressly incorporated by reference herein.

This application also expressly incorporates by reference herein the entire disclosure of U.S. application Ser. No. 09/613,425, entitled "Compositions for Imparting Desired Properties to Materials", which is being concurrently filed with the present application.

BACKGROUND OF THE INVENTION

1. Field of the Invention

The present invention relates to aqueous compositions for imparting a variety of characteristics to materials. For example, aqueous compositions of the present invention include compositions for coating/barrier layers, replacements/extenders for latex, and cross linkers for a variety of substances, as well as in adhesives/binders. Such compositions can impart various desired properties to substrates coated and/or impregnated therewith. Aqueous compositions of the invention are especially suitable for coating substrates, such as physiological substrates, porous substrates, cellulose substrates, textiles, and building materials, such as wood, metal, and glass. The aqueous composition of the present invention can also be used in inks, dye fixatives, adhesives, sealants, cellulosic products, personal care products such as cosmetics and hair styling products, resins, paint, coatings, and non-woven structures to provide adhesion, delivery, surface modification, strength and/or texture, and protection from the effects of liquids, and vapor and gases. A non-woven structure can be a sheet, web, or batt of directionally or randomly oriented fibers of natural and/or man-made fibers or filaments, bonded by friction, and/or cohesion and/or adhesion, excluding paper and products which are woven, knitted, tufted, stitch bonded, or felted by wet milling or not additionally needled, or that are bonded to each other by any techniques known in the art. An example of a non-woven structure includes a non-woven fabric which is a flat, flexible porous sheet structure produced by interlocking layers or networks of fibers, filaments or film-like filamentary structure.

In addition, the composition of the present invention is suitable for use in metal conversion coatings to enhance corrosion resistance of and paint adhesion to metal surfaces.

The present invention also includes products comprising such compositions as well as methods of producing such products.

2. Background of the Invention and Related Art

Materials can be treated with a variety of compositions to impart desired properties thereto.

Substrates are often coated with a coating composition to impart desired characteristics to the substrate, including the surface thereof.

Various substrates have been coated or otherwise treated with coating compositions to impart desired characteristics to the substrate, including the surface thereof. For example, a wide variety of building and finishing materials exists, which are employed in construction of static structures, such as residences and other buildings, and commercial structures, schools, public facilities, and the like. Many such materials are based on non-woven materials. Further, many such materials are coated and/or impregnated with a surface finish coating, either during manufacture, prior to installation, or post-installation, or in a combination of the above situations.

Such materials, particularly ceiling tiles, have been provided with prime coats comprising ethylene-vinyl chloride copolymer emulsions. Particularly suitable materials include those available from Air Products and Chemicals, Inc., of Allentown, Pa., under the trade name AIRFLEX®. Specific examples of such emulsions are disclosed in U.S. Pat. No. 4,673,702 to IACOVIELLO, and U.S. Pat. No. 4,962,141 to IACOVIELLO, et al., both assigned to Air Products and Chemicals, Inc., Allentown, Pa., both of which are hereby incorporated by reference as though set forth in full herein.

Paper for certain applications has been customarily strengthened with resins to impart strength thereto when the paper is wet. Such resins are commonly referred to as "wet strength resins." A frequently employed wet-strength resin for use in papers is that of the broad class of polyamidoamine-epihalohydrin resin polymers for resins. Such resins include those marketed under the trademark KYMENE® by Hercules Incorporated, Delaware. Such resins, and processes for their manufacture, are disclosed in, for example, U.S. Pat. Nos. 2,926,116 and 2,926,154, both to KEIM; U.S. Pat. No. U.S. Pat. 5,614,597 to BOWER; U.S. Pat. Nos. 5,644,021 and 5,668,246, both to MASLANKA; all assigned to Hercules Incorporated, all of which patents are hereby incorporated by reference as though set forth in full herein.

U.S. Pat. No. 4,859,527 discloses cellulosic non-woven products of enhanced water and/or solvent resistance obtained by pre-treatment of the cellulosic fibers. In some embodiments, this patent discloses that suitable pre-treatment agents include poly(aminoamide) epichlorohydrin resins. Suitable overcoat binders are disclosed as including ethylene-vinyl chloride-acrylamide polymers. Specific examples of the pre-treatment agents include KYMENE®, and HERCOBOND®, including HERCOBOND® 5100; overcoat binders include binders such as AIRFLEX® "EVCI" co-polymers (AIRFLEX® 4500).

There has also been a need for flexible coatings such as pretreatments and precoats on various substrates. Such substrates on which a need for a flexible coating exists include substrates subject to bending and flexing. Such substrates also can include those which can be cut. Ceiling tiles are exemplary of such substrates.

Coating compositions comprising poly(aminoamide) epihalohydrin resins such as KYMENE and latices such as AIRFLEX are used to treat ceiling tiles as disclosed in co-pending application Ser. No. 09/348,346, which is hereby incorporated by reference as though set forth in full herein.

Nail polish is another example of a coating for substrates. Aqueous-based nail polishes are disclosed in commonly assigned co-pending application Ser. No. 09/348,345, which is hereby incorporated by reference as though set forth in full herein. Nail polish is most commonly a colored liquid that dries, not unlike paint, into a hard, shiny coating. Nail polishes sold as articles of commerce are typically solutions and/or dispersions in an organic solvent, such as toluene or acetone.

Conventional nail polishes generally employ nitrocellulose as the film former. Typical formulations are disclosed in "Formulating Nail Lacquer", B. Albert, Drug and Cosmetic Industry, Vol. 48, (Nov. 1998), which is hereby incorporated by reference as though set forth in full herein, for its background information on such nail formulations.

U.S. Pat. No. 5,120,259 discloses a water-based nail polish consisting of at least one polyurethane and/or polyurethane copolymer in dispersed form as a binder, with a thickener and acrylated-styrene copolymer. The acrylated-styrene copolymer is employed to increase hardness of the dried coating.

U.S. Pat. No. 5,716,603 discloses a nail polish composition comprising an aqueous solution containing an acrylic resin cross linked with a difunctional acrylated urethane oligomer. This patent notes that nail polish formulations contain other additives, such as plasticizers and coalescents to modify the film and/or provide other desired or functional properties such as gloss, uniform color or resistance to chipping.

Changes in the overall formulation of substrate coatings have been attempted. For example, attempts have been made to improve physical properties such as water resistance, durability, scratch resistance, etc. well as good appearance, including finish color. However, there has been a continuing need for improvement.

Substrates are often coated with a coating composition to impart desired characteristics to the substrate, including the surface thereof. Porous building materials are illustrative of such substrates. A wide variety of building and finishing materials exists, which are employed in construction of static structures, such as residences and other buildings, and commercial structures, schools, public facilities, and the like. Many such materials are based on non-woven webs. Further, many such materials are coated and/or impregnated with a surface finish coating, either during manufacture, prior to installation, or post-installation, or in a combination of the above situations.

High grade accoustical ceiling tile is marketed for its appearance and sound characteristics. The manufacture of such materials may be generally divided into two stages: a wet end formulation stage and a fabrication stage.

In the wet end formulation stage, the baseboard tile is made from a slurry mixture of, for example, mineral wool, paper, perlite, clay and starch, which is drained on a wet-end forming machine or paper machine or similar system and dried, producing a thick mat. In the fabrication stage, the resultant mat is subsequently sanded, cut, designed into a pattern and "painted" (or coated). In such products, it is desirable to provide certain characteristics related to durability, handle ability and workability. For example, with ceiling tiles, it is extremely important to provide ceiling tiles which exhibit as low flaking and chipping characteristics as possible, particularly when making edge cuts or installing the tiles in the ceiling support grid. Attempts have been made to improve these characteristics by modifying the rough stock composition of the material fed into the board mill, as well as modifications to coatings, such as prime coatings, finish paints, finish coatings and edge coatings. In general, such approaches have included attempts to modify or provide new raw materials and/or change other processes of manufacture.

With respect to ceiling tiles, changes in the overall formulation of board material (that is, the slurry from which the board is made) and in the prime coat have been attempted. For example, attempts have been made to improve physical properties such as cuttability, durability, scratch resistance, reduction in flaking, chipping, etc., as well as good appearance, including finish color. However, there has been a continuing need for improvement.

SUMMARY OF THE INVENTION

The present invention relates to aqueous compositions comprising component (A) which comprises at least one water-soluble component comprising molecules which interact with or entangle with each other, such as at least one functional group that undergoes a crosslinking reaction, preferably upon drying and/or heating; and component (B) which comprises at least one film-forming material, preferably a latex material.

The aqueous compositions of the present invention can be used as coating/barrier layers, replacements/extenders for latex, and cross linkers, as well as in adhesives/binders. When used as coating/barrier layers, the aqueous composition of the present invention provides moisture barrier, edge seal, extenders for latices, stain resistance, water resistance/repellency, and porosity control for porous substrates, such as paper and textiles. Examples of coating/barrier layers include, but are not limited to, additives for texture in paint, binders for coatings (e.g., in paint), paint primers for all surfaces, additives for paper (e.g., paper coatings, paper printability, paper sizing, and paper wet/dry strength agent), precoats for coated paper, primers for printing, and replacements/extenders for latex in all applications using latex. In addition, the composition of the present invention is suitable for use in metal conversion coating to enhance corrosion resistance of and paint adhesion to metal surfaces.

The aqueous composition of the present invention can also be used in adhesives/binders, such as adhesives, binders (e.g., for coatings and personal care products such as cosmetics and hair styling products), additives for engineered wood products, dye fixatives, paper wet/dry strength additives, additives in paint, resins such as permanent press resins (e.g., for wrinkle resistance), precoats for coated papers, primers for printing for any surfaces (e.g., wood, paper, metal, etc.), protective coatings, surface modifiers for wood/metal/glass, and replacement/extender for latex as internal binders in all applications using latex. When used in an adhesive/binder, the aqueous composition of the present invention can provide dimensional stability control and/or strength for paper, wood, and textiles, as well as texture in paint.

In addition, the aqueous composition of the present invention can also be used as cross linkers in additives for engineered wood products, paper sizing agents, paper wet/dry strength additives, permanent press resins, replacement for latex as internal binders in all applications using latex, surface modifiers in wood/metal/glass, ink vehicles, and textile wet processing aids. The use of the aqueous composition of the present invention as cross linkers provides sealing properties, stain resistance, textile strength, and water resistance repellency For example, component (A) can beneficially be selected from at least one of acrylamide-based crosslinkable polymers (e.g., cationic functionalized polyacrylamides.), polyamidoamine-epihalohydrin resins, polyamines, and polyimines.

In some preferred embodiments, the at least one functional group of component (A) can be selected from epoxy, azetidinium, aldehyde, carboxyl group, acrylate and derivatives thereof, acrylamide and derivatives thereof, and quaternary amine.

The film-forming polymer can be selected, for example, from at least one polymer derived from monomers of alkyl halides of from 2–12 C atoms, alkene halides of from 2–12 C atoms, alkyl acrylamides of from 2–12 C atoms, alkene acrylamides of from 2–12 C atoms, alkyl acrylates of from 2–12 C atoms, and alkene acrylates of from 2–12 C atoms. Some preferred polymers include those derived from at least one monomer selected from styrene, dimethylstyrene, vinyltoluene, chloroprene, butadiene, ethylene, acrylamide, acrylonitrile, acrolein, methylacrylate, ethylacrylate, acrylic acid, methacrylic acid, methyl methacrylate, n-butyl acrylate, vinylidene chloride, vinyl ester, vinyl chloride, vinyl acetate, acrylated urethane, hydroxyethyl acrylate, dimethylaminoethyleneacrylate, and vinyl acetate. For example, the film-forming polymer can be a latex selected from at least one polymer derived from at least one monomer comprising repeating units derived from an alkyl halide having at least one double bond, such as a vinyl halide, e.g., vinyl chloride, and an alkene, such as ethylene, wherein the alkyl halide has from 2 to 12 C atoms, and wherein the alkene has from 2 to 12 C atoms. The alkyl halide can be a vinyl halide, for example. In some embodiments, the composition further includes at least one acid, preferably fluoacid (e.g., fluotitanic acid, fluozirconic acid, fluosilicic acid, and fluoboric acid).

In some preferred embodiments, the composition can have a dry weight ratio of (A) to (B) of about 5:1 to 1:1, more preferably about 2:1 to 1:1 or about 1.69:1.

The invention also relates to methods of preparing a coated substrate comprising, for example coating a substrate with a coating composition including components (A) and (B); and curing the coating composition on the substrate. Further, the methods can include coating a substrate with a coating composition including components (A) and (B), and drying the composition in place on the surface of a substrate or rinsing a substrate with a coating composition.

In addition, the present invention is also directed to coated substrate materials coating substrates such as cellulosic products and coating, non-woven products such as sheets, ceiling tiles, and metal. Preferably, the present invention is also directed to methods of preparing coated substrates such as cellulosic products, non-woven sheets, ceiling tiles, and metal using components (A) and (B), e.g., a cured composition of components (A) and (B).

The present invention is also specifically directed to methods for metal conversion coating using the composition containing components (A) and (B) and at least one acid, preferably fluoacid (e.g., fluotitanic acid, fluozirconic acid, fluosilicic acid, and fluoboric acid), preferably at a pH from about 1.5 to about 5.0. Preferably the present invention is directed to a method of forming a substantially chromium-free conversion coating on a metal surface using the composition containing components (A) and (B) and at least one acid, preferably fluoacid (e.g., fluotitanic acid, fluozirconic acid, fluosilicic acid, and fluoboric acid), preferably at a pH from about 1.5 to about 5.0. More preferably, the present invention is directed to a method of forming a substantially chromium-free, dried in place conversion coating on a metal surface using the composition containing components (A) and (B) and at least one acid, preferably fluoacid (e.g., fluotitanic acid, fluozirconic acid, fluosilicic acid, and fluoboric acid), preferably at a pH from about 1.5 to about 5.0. The amount of the composition in (1) can preferably be from about 0.1 to about 90% by weight, and the amount of acid can preferably be from about 0.2 to about 20% by weight.

The present invention is also directed to substrates, preferably metal substrates comprising a cured composition which comprises component (A) which comprises at least one water-soluble component comprising at least one functional group that undergoes a crosslinking reaction, preferably upon drying and/or heating; and component (B) which comprises at least one film-forming material, preferably a latex material Further, the present invention also relates to methods of preparing cellulosic products, preferably ceiling tiles and non-woven products such as sheets.

For example, the invention provides a method of substantially simultaneously or sequentially adding to a system comprising cellulosic fibers, wherein the system is selected from at least one of aqueous system, felt, web, and combinations thereof (A) at least one water-soluble component comprising at least one functional group that undergoes a crosslinking reaction; and (B) at least one film-forming polymer.

The present invention also relates to cellulosic products, preferably ceiling tiles and non-woven products such as sheets comprising a composition which comprises component (A) which comprises at least one water-soluble component comprising at least one functional group that undergoes a crosslinking reaction, preferably upon drying and/or heating; and component (B) which comprises at least one film-forming material, preferably a latex material.

In some aspects, the present invention provides a coating composition for substrates, and, in particular, porous substrates, especially porous substrates which can be handled or manipulated after coating.

In some aspects, the invention relates to building materials, including ceiling tiles and the like, which exhibit improved cuttability as shown by low levels of flaking and/or chipping.

The present invention provides a coating composition for building materials, including ceiling tiles and the like, which achieve a desired finish color and face durability (such as scratch resistance, abrasion resistance and scrubbability properties).

Preferably, the invention provides such materials which exhibit a combination of improved cuttability as shown by low levels of flaking and/or chipping and abrasion resistance.

Also preferably, the invention provides coating compositions for building materials including ceiling tiles, which, when the building materials are coated with the composition and the composition is cured, exhibit a combination of the foregoing attributes, while also providing good acoustics, low sag, good durability, good aging characteristics, good color or cover characteristics, good fire resistance, and favorable properties for installation.

The coatings of the invention can be applied to a porous type fiber substrate (such as a ceiling tile) and impart durability properties to that substrate without sealing it off, losing porous properties (such as acoustics) or diminishing aesthetic appearance, while still maintaining a Class A fire performance.

The invention provides the foregoing advantages. The invention also provides a composition that can be easily used.

The components of the composition can be easily mixed, especially in embodiments where they are in liquid form, such as in the form of an emulsions.

Compositions of the invention when curing do not require a high degree of ventilation.

Compositions of the invention are also stable over time.

Compositions of the invention possess properties which render them especially suitable for application to substrates by spraying. For example, the compositions of the invention have low viscosities and contain a low level of solids. Thus, the compositions of the invention may be sprayed without substantial plugging of the spraying equipment during operation. Additionally, the compositions of the invention may be sprayed without the need for large amounts of air for spraying; as a result of the low viscosity of the compositions, the compositions may readily be atomized at lower pump pressures.

In some aspects, the invention provides a coating composition comprising:
  (A) at least one polyamidoamine-epihalohydrin resin; and
  (B) at least one material in an amount sufficient to impart a cuttability value of less than about 15 to a substrate coated with the cured coating composition.

In some aspects, the invention provides a coating composition comprising:
  (A) at least one polyamidoamine-epihalohydrin resin; and
  (B) at least one material selected from flexibilizing materials, crosslink inhibitors and combinations thereof in an amount sufficient to impart a cuttability value of less than about 15 to a substrate coated with the coating composition.

In some aspects, the invention provides a coating composition comprising:
  (A) at least one polyamidoamine-epihalohydrin resin; and
  (B) at least one polymer comprising repeating units derived from an alkyl halide having at least one double bond and an alkene.

In some aspects, the invention provides building units coated with a composition comprising:
  (A) at least one polyamidoamine-epihalohydrin resin; and
  (B) at least one polymer comprising repeating units derived from an alkyl halide having at least one double bond and an alkene.

In some aspects, the invention provides coating compositions comprising:
  (A) at least one polyamidoamine-epihalohydrin resin; and
  (B) at least one material in an amount sufficient to impart sufficient flexibility, such that when the coating is applied to a substrate and cured, the cured coating exhibits substantially no delamination from the substrate or cracking, when the substrate is bent substantially 180° subsequent to curing. The thickness of the coating after curing is preferably in the range of about 5–10 mils when cured.

Preferably, such compositions exhibit sufficient flexibility, such that when the coating is applied to a substrate and cured, the cured coating exhibits substantially no delamination or cracking, when the substrate is bent substantially 360°.

Component (A) can comprise an aqueous solution of component (A) present in an amount in a range of from about 5% to about 95% by weight based on the total weight of all components of the composition, and component (B) can comprise an aqueous emulsion of component (B) present in an amount in a range of from about 5% to about 95% by weight based on the total weight of all components of the composition. Component (A) can comprise an aqueous solution of component (A) present in an amount in a range of from about 50% to about 85% by weight based on the total weight of all components of the composition, and component (B) can comprise an aqueous emulsion of component (B) present in an amount in a range of from about 8% to about 50% by weight based on the total weight of all components of the composition. Component (A) can comprise an aqueous solution of component (A) present in an amount of about 75% by weight based on the total weight of all components of the composition, and component (B) can comprise an aqueous emulsion of component (B) present in an amount of about 11% by weight based on the total weight of all components of the composition.

The coating compositions can further comprise a surfactant. The surfactant can comprise an octylphenoxypolyethoxyethanol nonionic surfactant. The surfactant can be present in an amount of up to 5%, by weight. The surfactant may be present in an amount of up to about 1% by weight. The surfactant may be present in an amount of about 0.05–0.25% by weight.

In such compositions, the weight ratio of (A):(B) is from about 0.05 to about 19, preferably about 4 to about 12, more preferably from about 6 to about 8, more preferably about 6.5 to about 7.0, and more preferably about 6.75.

The invention also provides coated building units comprising a substrate such coating compositions as set forth above. The substrate can comprise a ceiling tile or a wall board.

Such coated building units exhibit a Hess Rake Test Value of at least about 8, and a cuttability value of less than about 15.

Preferably such coated building units exhibit a Hess Rake Test Value at least about 10, and a cuttability value of less than about 10; preferably a Hess Rake Test Value of at least about 12, and a cuttability value of less than about 2; preferably a Hess Rake Test Value of at least about 14, and a cuttability value of less than about 1.

The substrate can comprise a ceiling tile and/or a wall board.

Preferably such coated building units exhibit a Hess Rake Test Value range of at least about 8, and a cuttability value of less than about 15; preferably a Hess Rake Test Value of at least about 10, and a cuttability value of less than about 10; more preferably a Hess Rake Test Value of at least about 12, and a cuttability value of less than about 2; and more preferably a Hess Rake Test Value of at least about 14, and a cuttability value of less than about 1.

Component (B) is preferably selected from copolymers which may be derived from monomers including at least one of alkyl halides, alkenes, methyl methacrylate, butyl acrylate, styrene vinylidene chloride, acrylic acid, methacrylic acid, and vinyl acrylic-based materials.

Component (B) preferably comprises an alkyl halide, preferably a vinyl halide, and preferably vinyl chloride. Preferably the alkene comprises an olefin, preferably ethylene.

The invention also provides methods of producing a coated substrate comprising (1) coating a substrate with a coating composition comprising:
  (A) at least one polyamidoamine-epihalohydrin resin; and
  (B) at least one material in an amount sufficient to impart a cuttability value of less than about 15 to the coated substrate upon curing the coating composition; and (2) curing the coating composition on the substrate. Preferably, the cuttability value is less than about 10, more preferably less than about 2, more preferably less than about 1. The substrates and compositions employed can be as defined above.

DETAILED DESCRIPTION OF THE PREFERRED EMBODIMENTS

The present invention relates to aqueous compositions comprising component (A) as defined herein and component (B) as defined herein.

The aqueous compositions of this invention have various utilities including uses as coating/barrier layers, replacements/extenders for latex, and cross linkers, as well as uses in adhesives/binders. When used as coating/barrier layers, the aqueous composition of the present invention provides moisture barrier, edge seal, extenders for latices, stain resistance, water resistance/repellency, and porosity control for porous substrates. Examples of porous substrates include, but are not limited to, paper products, non-woven products such as sheets, and textiles. "Extender of latices" refers to the ability of the composition of the present invention (i.e., components (A), and (B)) to be a substitute for latex, and can be used in place of or partial substitution for a latex in any applications where latex could be used.

Examples of coating/barrier layers include, but are not limited to, additives for texture in paint, binders for coatings (e.g., in paint), paint primers for all surfaces, additives for paper (e.g., paper coatings, paper printability, paper sizing, and paper wet/dry strength agent), precoats for coated paper, primers for printing, and replacements/extenders for latex as internal binders in all applications using latex.

The aqueous composition of the present invention can be used in adhesives/binders, such as adhesives, binders (e.g., for coatings and personal care products such as cosmetics and hair styling products), additives for engineered wood products, dye fixatives, paper wet/dry strength additives for cellulosic products (e.g., non-woven products such as sheets and ceiling tiles), additives in paint, resins such as permanent press resins (e.g., wrinkle resistance), precoats for coated papers, primers for printing, protective coatings, surface modifiers for wood/metal/glass, and replacement/extender for latex as internal binders in all applications using latex. When used in an adhesive/binder, the aqueous composition of the present invention can provide dimensional stability control and/or strength for paper, wood, and textiles, as well as texture in paint (such that when a paint is dry, it forms a surface having irregular contours).

The aqueous composition of the present invention can also be used as cross linkers in additives for engineered wood products, paper sizing agents, paper wet/dry strength additives, permanent press resins, replacement for latex as internal binders in all applications using latex, surface modifiers in wood/metal/glass, ink vehicles (which provide impact to ink set and gloss), and textile wet processing aids. The use of the aqueous composition of the present invention as cross linkers provides sealing properties, stain resistance, textile strength, and water resistance repellency.

In addition, the present invention is also directed to methods of preparing coated substrates such as cellulosic products, non-woven products such as sheets, ceiling tiles, and metal. Preferably, the present invention is also directed to methods of preparing coated substrates such as cellulosic products, non-woven sheets, ceiling tiles, and metal using components (A) and (B).

The invention also relates to methods of preparing a coated substrate comprising, for example coating a substrate with a coating composition including components (A) and (B); and curing the coating composition on the substrate. Further, the present invention includes methods for metal conversion coating which includes coating a substrate with a coating composition including components (A) and (B), and drying the composition in place on the surface of a substrate or rinsing a substrate with a coating composition. The methods of metal conversion coating comprise using the composition containing components (A) and (B) and at least one acid, preferably fluoacid (e.g., fluotitanic acid, fluozirconic acid, fluosilicic acid, and fluoboric acid), preferably at a pH from about 1.5 to about 5.0. Preferably the present invention is directed to a method of forming a substantially chromium-free conversion coating on a metal surface using the composition containing components (A) and (B) and at least one acid, preferably fluoacid (e.g., fluotitanic acid, fluozirconic acid, fluosilicic acid, and fluoboric acid), preferably at a pH from about 1.5 to about 5.0. More preferably, the present invention is directed to a method of forming a substantially chromium-free, dried in place conversion coating on a metal surface using the composition containing components (A) and (B) and at least one acid, preferably fluoacid (e.g., fluotitanic acid, fluozirconic acid, fluosilicic acid, and fluoboric acid), preferably at a pH from about 1.5 to about 5.0.

"Substantially chromium-free conversion coating" refers to a conversion coating that does not intentionally include added chromium, but can contain a trace amount of chromium.

Further, the present invention also relates to methods of preparing cellulosic products, preferably ceiling tiles and non-woven products such as sheets using the composition containing components (A), and (B). Specifically the present invention relates to methods of preparing cellulosic products which comprise (1) substantially simultaneously or sequentially adding a composition to a system comprising cellulosic fibers, wherein the system is selected from at least one of aqueous system, felt, web, and combinations thereof, and wherein the composition comprises (A) at least one water-soluble component comprising at least one functional group that undergoes a crosslinking reaction; and (B) at least one film-forming polymer.

"Substantially simultaneously adding" or "simultaneously adding" refers to adding two substances to a slurry or suspension (e.g., such as a cellulosic slurry) with substantially no time difference and essentially at the same position in the system or process. The two substances being added can be in the form of a mixture as well as separately added, e.g., by adding one substance during the addition of the other.

"Sequential addition" refers to at least two different substances being added to different locations at the same time or at a different time and/or the same location at different time on a machine used to prepare cellulose products. These locations are far away enough so that the one substance added is mixed with the cellulose slurry before another substance is added. A combination of sequential and simultaneous addition may also be employed.

In some aspects, the present invention relates to the discovery that compositions comprising mixtures comprising: component (A) comprising a polyamidoamine-epihalohydrin, and component (B) comprising a component which cooperates with or moderates the properties of component (A) and preferably selected from flexiblizing components, components which inhibit cross-linking, and mixtures thereof, provide an unexpectedly superior spectrum of properties when applied as a coating to various substrates. Compositions of the invention are especially suitable for coating porous substrates. Exemplary substrates include building materials, such as ceiling tiles, wall boards and the like. In accordance with one definition as used herein, without wishing to be bound by theory, it is believed that the flexibilizing component functions, at least in part, to hinder cross-linking of component (A).

Component (A)

Component (A) may be any component having molecules which undergo molecular interaction such as molecular entanglement, crosslinking, molecular bonding, etc. upon drying and/or heating. Without wishing to be bound by theory, suitable materials for component (A) include, but are not limited to, materials that interact on a molecular level to form a network distributed within component (B) when components (A) and (B) are cured.

As discussed above, component (A) of the aqueous composition of the present invention can comprise at least one water-soluble component comprising at least one functional group that undergoes a crosslinking reaction, preferably upon drying and/or heating. "Water-soluble component" refers to a component that dissolves in water to form a homogeneous liquid. Examples of suitable functional groups of component (A) preferably include, but are not limited to, epoxy, azetidinium, aldehyde, carboxyl group, acrylate and derivatives thereof, acrylamide base and derivatives thereof, and quaternary amine, more preferably azetidinium, epoxy, and aldehyde, and most preferably azetidinium and epoxy.

Examples of component (A) preferably include, but are not limited to, acrylamide-based crosslinkable polymers, polyamidoamine-epihalohydrin resins, and polyamines, and polyimines, more preferably cationic functionalized polyacrylamides (HERCOBOND 1000® manufactured by Hercules Incorporated) such as those disclosed in U.S. Pat. No. 5,543,446 which is incorporated herein by its entirety, creping aids such as CREPETROL® A 3025 disclosed in U.S. Pat. No. 5,338,807 which is incorporated herein by its entirety, and polyamidoamine-epihalohydrin resins such as those disclosed in U.S. Pat. Nos. 2,926,116 and 2,926,154, to KEIM, incorporated by reference in their entirety herein.

In some aspects of the present invention, the preferred materials for component (A) include polyamidoamine-epihalohydrin resins such as those disclosed in U.S. Pat. Nos. 2,926,116 and 2,926,154, to KEIM, incorporated by reference in their entirety herein. Preferred polyamidoamine-epihalohydrin resins can also be prepared in accordance with the teachings of U.S. Pat. No. 5,614,597 to BOWER and commonly assigned to Hercules Incorporated, incorporated by reference in their entirety herein. As discussed in U.S. Pat. No. 5,614,597 to BOWER, these processes typically involve reacting aqueous polyamidoamine with an excess of epihalohydrin to completely convert amine groups in the polyamidoamine to epihalohydrin adducts. During the reaction halohydrin groups are added at the secondary amine groups of the polyamidoamine as shown in the following example, using epichlorohydrin as the epihalohydrin:

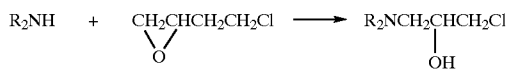

where R₂N- represents a secondary amine group of the polyamidoamine.

After the epihalohydrin has been added and when heat evolution has subsided, the reaction mixture is heated to effect crosslinking and viscosity increase. During this reaction, azetidinium groups are formed. These functional groups are typically employed to impart wet strength to paper by forming a strong crosslinked network with the paper fibers.

Preferred polyamidoamine-epihalohydrin resins include polyamidoamine-epichlorohydrins such as those sold by Hercules Incorporated of Wilmington, Del., under various trade names. Preferred polyamidoamine-epihalohydrin resins available from Hercules include the KYMENE® resins and the HERCOBONDS resins. KYMENE 557H® resin; KYMENE 557LX2® resin; KYMENE 557SLX® resin; KYMENE 557ULX® resin; KYMENE 557ULX2® resin; KYMENE 709200 resin; KYMENE 736® resin; and HERCOBOND 5100® resin. Of these, KYMENE 557H® resin and HERCOBOND 5100® are especially preferred polyamidoamines, available in the form of aqueous solutions. KYMENE 736® resin (a polyamine) can also be employed as component (A). It is expressly contemplated that equivalents to each of the foregoing resins are within the scope of the present invention.

Component (B)

Without wishing to be bound by theory, suitable materials for component (B) include any materials that are capable of forming a continuous phase that can be modified by the network structure of component (A) described above. As discussed above, component (B) comprises at least one film-forming material such as a polymer, preferably a latex material.

Examples of other film-forming material of the present invention preferably include, but are not limited to, polymers derived from monomers including at least one of alkyl halides of from 2–12 C atoms, alkene halides of from 2–12 C atoms, alkyl acrylamides of from 2–12 C atoms, alkene acrylamides of from 2–12 C atoms, alkyl acrylates of from 2–12 C atoms, and alkene acrylates of from 2–12 C atoms.

In some aspects of the present invention, the film-forming layer is a latex selected from at least one polymer comprising repeating units derived from an alkyl halide having at least one double bond and an alkene, wherein the alkyl halide has from 2 to 12 C atoms, and wherein the alkene has from 2 to 12 C atoms.

"Latex" refers to an aqueous dispersion of a water-insoluble polymer. Latex materials are prepared in an emulsion polymerization process wherein the insoluble monomer is emulsified, with a surfactant, into small particles of less than about 10,000 nm or 10 microns in diameter in water and polymerized using a water-soluble initiator. The resultant product is a colloidal suspension of fine particles, preferably about 50 to 1000 nm in diameter. See, for example, Kirk-Othmer Encyclopedia of Chemical Technology, fourth edition, volume 15, page 51 (J. Wiley & Sons, N.Y., 1995), which is hereby incorporated herein in its entirety. "Colloidal suspension" refers to a dispersion of fine droplets or particles in a liquid medium.

Suitable latices can be readily identified by those of ordinary skill in the art, based on physical properties using fully conventional considerations, including stability, rheology, film formation and film properties, interfacial reactivity and substrate adhesive can be determined by colloidal and polymeric properties of the latex. Colloidal properties include particle size and morphology distribution solids, pH, viscosity, and stability. Molecular weight distribution, monomer sequence and distribution, glass-transition temperature and crystallinity are well known in the art.

Latex applications include, but are not limited to, uses as adhesives, binders, coatings, elastic materials, foam products, modifiers, and supports for immobilization of other materials.

Commercially available latices are derived from a large variety of monomers including, but not limited to, styrene, dimethylstyrene, vinyltoluene, chloroprene, butadiene, ethylene, acrylamide, acrylonitrile, acrolein, methylacrylate, ethylacrylate, acrylic acid, methacrylic acid, methyl methacrylate, n-butyl acrylate, vinylidene chloride, vinyl ester, vinyl chloride, vinyl acetate, acrylated urethane, hydroxyethyl acrylate, dimethylaminoethyleneacrylate, and vinyl acetate.

Other examples of the latex material preferably include, but are not limited to, copolymers of alkyl halides and alkene halides, such as copolymers of vinyl or allyl halides and alkenes. Any akyl halides and any alkene halides, which copolymerize to form copolymers with each other, may be employed. Standard textbooks list exemplary materials. See, for example, Organic Chemistry, Morrison & Boyd, Allyn and Bacon, Inc. 1973, which is hereby incorporated by reference as though set forth in full herein for its disclosure of such materials. Preferred alkyl halides include allyl and/or vinyl halides of from 2–12 C atoms, preferably from 2–6 C atoms, more preferably from 2–4 C atoms and most preferably about 2 C atoms. Copolymers of vinyl halides (especially vinyl chloride) and alkenes, preferably of from 2–12 C atoms, preferably from 2–6 C atoms, more preferably from 2–4 C atoms and most preferably of about 2–3 C atoms, especially propylene and/or ethylene, are especially preferred.

In some aspects of the present invention, component (B) can comprise any component that functions to cooperate with or moderate the properties of component (A). In accordance with one definition herein, materials for component (B) comprise materials that function to flexibilize component (A) after the compositions of the invention are applied as a coating, materials that tend to inhibit crosslinking of component (A), and mixtures of such materials are considered exemplary. Materials for component (B) are not limited to these exemplary definitions, however.

The degree to which component (A) is flexibilized by component (B) may be expressed in terms of a cuttability value. An exemplary procedure for determining the cuttability value of a substrate (such as a ceiling tile or a wall board) coated with the composition of the invention is set forth in the Examples, below. The degree to which component (A) is flexibilized by component (B) may be expressed in terms of the degree to which a substrate (such as a sheet of aluminum, such as a pie pan), coated with a composition of the invention which is subsequently cured, can be bent substantially without cracking or delaminating the coating from the substrate. An exemplary procedure for determining this degree of flexibility is also set forth in the Examples, below.

Preferred materials for component (B) include copolymers of alkyl halides and alkenes, such as copolymers of vinyl or allyl halides and alkenes. Any akyl halide and any alkene, which copolymerize to form copolymers with each other, may be employed. Standard textbooks list exemplary materials. See, for example, *Organic Chemistry*, Morrison & Boyd, Allyn and Bacon, Inc. 1973, which is hereby incorporated by reference as though set forth in full herein for its disclosure of such materials. Preferred alkyl halides include allyl and/or vinyl halides of from 2–12 C atoms, preferably from 2–6 C atoms, more preferably from 2–4 C atoms and most preferably about 2 C atoms. Copolymers of vinyl halides (especially vinyl chloride) and alkenes, preferably of from 2–12 C atoms, preferably from 2–6 C atoms, more preferably from 2–4 C atoms and most preferably of about 2–3 C atoms, especially propylene and/or ethylene, are especially preferred.

Any copolymers of vinyl chloride and ethylene may be employed as component (B). Exemplary copolymers of vinyl chloride and ethylene are disclosed in U.S. Pat. No. 4,673,702 to IACOVIELLO, and U.S. Pat. No. 4,962,141 to IACOVIELLO, et al., incorporated by reference in their entireties herein. These copolymers (also referred to herein as "EVCI" copolymers) may be prepared in any way. By way of example, they may be prepared (preferably in the form of an emulsion) as described in U.S. Pat. No. 4,962,141 to IACOVIELLO et al. by the following procedures.

Suitable EVCI copolymer emulsions may be prepared by copolymerizing the monomers in the presence of suitable emulsifying agents, i.e., protective colloids and surfactants, in an aqueous medium under pressures generally not exceeding about 100 atm and in the presence of a redox system which is added incrementally. The copolymerization reaction is performed under an ethylene pressure which is sufficient to provide the copolymer with about 5 to 35 wt% ethylene content, preferably about 15 to 25 wt%. Pressures of about 50 to 100 atm are generally used to afford such an ethylene content.

The EVCI copolymer emulsions may additionally contain from 0.1 to 30 wt% of an external crosslinking agent based upon the total weight of the copolymer. Suitable external crosslinking agents include melamine/formaldehyde resins, polyisocyanates such as water dispersible polymeric methyl diphenyl diisocyanates and water based phenolic resins.

In carrying out the polymerization, substantially all of the polyvinyl alcohol and a portion of the vinyl chloride is initially charged into the polymerization vessel which is then pressurized with ethylene. Most advantageously, at least about 5 wt% and preferably, at least about 15 wt% of the total vinyl chloride to be polymerized is initially charged into the reactor. The remainder of the vinyl chloride is added, desirably at a substantially uniform rate, after the initially charged vinyl chloride monomer content has been substantially reduced as evidenced by a decrease in the rate of polymerization. This controlled addition avoids over pressurization of the reactor. No more than about 60% of the vinyl chloride should be charged initially since a prepolymer can be generated in-situ in order to obtain the desired stable emulsions.

The quantity of ethylene entering the copolymer is influenced by the pressure, the mixing, the addition rate and amount of free radical generating source. The ethylene content of the copolymer can be increased by utilizing a higher ethylene pressure, increasing agitation during mixing or employing a higher free radical source rate.

The process of forming the EVCI copolymer emulsions may comprise preparing an aqueous solution containing substantially all of a polyvinyl alcohol dispersing agent. This aqueous solution and the initial charge of vinyl chloride may be added to the polymerization vessel and ethylene pressure may then be applied to the desired value. The mixture is mixed thoroughly to dissolve ethylene in the vinyl chloride and into the water phase. The charge can be conveniently elevated to polymerization temperature during this mixing period. A polymerization temperature of about 55° C. and an ethylene pressure in the range of 750 psig to 1000 psig may be employed to provide a copolymer with about 20–30 wt% ethylene. Mixing can be effected by means of an agitator or other known mechanism.

The polymerization is initiated by introducing initial amounts of a free radical generating source into the reactor vessel containing the monomer premix. When employing a redox system, either the oxidant or reductant component can be added initially to the aqueous medium containing the polyvinyl alcohol and vinyl chloride with the other redox component added to initiate the reaction. Upon initiating the polymerization, any desired monomer such as the hydroxyalkyl- or carboxylic acid-containing functional co-monomers disclosed herein may be added incrementally to the reaction vessel.

The reaction may generally be continued until polymerization is no longer self-sustaining and desirably until the residual vinyl chloride content is below 0.5%. The completed reaction product is removed from the presence of ethylene and maintained at a temperature above the Tg of the copolymer while sealed from the atmosphere. The reaction mixture can also be transferred to a degasser for removal of unreacted ethylene.

It will be readily appreciated by those of ordinary skill in the art that the foregoing is exemplary only, and that the generically and/or specifically defined reactants and conditions can be substituted by equivalent reactants and conditions. Especially preferred copolymers for component (B) include those marketed by Air Products and Chemicals, Inc., of Allentown, Pa., under the trade name AIRFLEX®; especially, AIRFLEX 4530®, AIRFLEX 4514®, AIRFLEX 4500®. It is expressly contemplated that equivalents to such vinyl chloride/ethylene copolymers are within the scope of the present invention. Thus, for example, any polymer or copolymer which moderates component (A) such as by functioning to flexibilize component (A), and/or any polymer or copolymer that inhibits crosslinking such that when the water from the composition is driven off, and the coating is cured, can be bent 180°, preferably 360°, without cracking or delaminating, is within the scope of the invention. Preferably any copolymer which functions to flexibilize component (A), and/or any polymer or copolymer that inhibits crosslinking such that when the coating is applied to a substrate, such as an aluminum sheet and the water from the composition is driven off, the coating can be bent 180°, preferably 360°, without cracking or delaminating from the substrate, is within the scope of the invention. Preferably, the combination of components (A) and (B) result in compositions exhibiting good memory, in addition to the good flexibility discussed above. For example, such compositions preferably exhibit good memory such that a cured coating when deformed will return to the position or configuration in which it was before it was deformed.

Other materials for component (B) include, but are not limited to, NEOCAR® manufactured by Union Carbide (vinyl ester/acrylic acid), RES 3077® manufactured by Rohm & Haas (vinyl acetate/acrylic acid), FLEXTHANE 620® by Air Products (vinyl chloride amide terpolymer), VINAC 884® by Air Products (vinyl acetate), DOW 620® by Dow Chemical Company (styrene butadiene rubber), FLEXBOND 325® (vinyl acetate-acrylic copolymer latex) by Air Products, LUCIDENE 243® (styrene-acrylic polymer emulsion), HYCAR 26256® (acrylic ester copolymer latex) and MORKOTE 1725® (acrylic copolymer emulsion).

As discussed above, such materials for component (B) include water compatible systems such as copolymers that can contain the following monomers: methyl methacrylate, butyl acrylate, styrene vinylidene chloride, acrylic acid, and methacrylic acid. Suitable copolymers include acrylated urethanes prepared by reacting a hydroxy acrylate or methacrylate; a diol, polyester or diamine; and a diisocyanate can be used. Preferred monomers are disclosed in U.S. Pat. No. 5,716,603, which is hereby incorporated by reference as though set forth in full herein for its teachings in this regard. Other copolymers that appear to be useful include acrylic and vinyl acrylic-based materials.

Other examples of (B) include, but are not limited to, vinyl ester/acrylic, vinyl acetate/acrylic, vinyl acetate/ethylene, vinyl chloride amide terpolymer, vinyl acetate, and styrene/butadiene.

Other materials for component (B) can also include FLEXBOND 325® (vinyl acetate-acrylic copolymer latex), LUCIDENE 243® (styrene-acrylic polymer emulsion), HYCAR 26256® (acrylic ester copolymer latex) and MORKOTE 1725® (acrylic copolymer emulsion).

Compositions

The aqueous compositions of the invention are preferably employed in the form of an aqueous admixture, preferably an aqueous emulsion, and conveniently in preferred embodiments, in the form of an aqueous emulsion system resulting from the admixture of component (A) and component (B). In addition, the aqueous composition of the present invention can include, water and at least one surfactant and/or additive.

The pH of the aqueous composition containing components (A) and (B) can be adjusted to suit particular utilities. Preferably, the pH is from about 3 to about 9, more preferably from about 3 to about 7, and most preferably about 4.5.

The present invention is preferably prepared by adding 75 g of component (A), preferably Hercobond 5100® or Kymene 557H® to 11.11 g an emulsion of component (B), preferably Airflex 4530® with mechanical stirring and adding water to make a 100 g solution.

The coating compositions of the invention are preferably employed in the form of an aqueous admixture, preferably an aqueous emulsion, and conveniently in preferred embodiments, in the form of an aqueous emulsion system resulting from the admixture of an solution of component (A) and an emulsion of component (B), and optionally water and a surfactant.

Thus, compositions of the invention may be prepared by mixing commercially available solutions of component (A) and component (B). Because such products are commercially available, it is expedient and convenient to employ components (A) and (B) "as received" from the suppliers, although this is not required. As illustrative examples, such solutions are available in concentrations of about 12.5% ((conveniently expressed as percent solids) based on weight of resin to total weight of "as received" solution) for component (A), and concentrations of about 50% (based on weight of resin to total weight of "as received"emulsion) for component (B).

At concentrations of about 12.5% for an solution of component (A) and about 50% for an emulsion of component (B), solutions of component (A) are employed in the compositions in amounts of from about 5 to about 95%, preferably from about 50% to about 85%, more preferably about 75% (based on the total weight of all components of the composition), and emulsions of component (B) are employed in the compositions in amounts of from about 5% to about 95%, preferably from about 8% to about 50%, more preferably about 11% (based on the total weight of all components of the composition). Compositions of about 75% for component (A) and 1.11% for component (B) have been found to be particularly preferred, with the remaining components of the composition being surfactant (preferably in an amount of about 0.06%), and water.

This may also be expressed such that, the compositions of the invention may have content of solids of component (A) (in terms of active ingredient, i.e., resin) in a range of from about 1% to about 85%, preferably about 1.5% to about 82.5%, most preferably about 63% (based on the total weight of the two resins, i.e., based on the total weight of the resins of component (A) and (B)), and content of resin of component (B) (in terms of active ingredient, i.e., resin) in a range of from about 15% to about 99%, more preferably about 17.4% to about 98.7%, most preferably about 37% (based on the total weight of the two resins, i.e., based on the total weight of the resins of component (A) and (B)).

The amounts of component (A) and component (B) employed in the aqueous compositions of the invention may also be expressed in terms of a ratio (A):(B), based on dry weight of polymer of component (A) to the dry weight of the polymer of component (B). The aqueous compositions of the invention preferably include those wherein the ratio of (A):(B) is from about 5:1 to about 1:5, more preferably from about 2:1 about to about 1:1, and more preferably from about 1.69: 1.

The amounts of component (A) and component (B) employed in the compositions of the invention may also be expressed in terms of a ratio (A):(B), based on the weight of polymer of component (A) to the weight of the polymer of component (B) (that is (A)/(B), compositions of the invention include those wherein the ratio of (A):(B) is from about 0.05 to about 19, preferably from about 4 to about 12, more preferably from about 6 to about 8, more preferably from about 6.5 to about 7.0, most preferably about 6.75.

Optional Surfactants and Additives

In preparing the aqueous compositions of the invention, solutions of components (A) and (B), water, and optionally, at least one surfactant and/or at least one additive and/or a least one acid, may be mixed in any suitable mixing vessel, preferably with agitation, such as stirring. A mixing vessel equipped with a stirrer may be employed particularly for this purpose. These components may be added to the mixing vessel in any order of addition, or concurrently.

The compositions also preferably comprise a surfactant. Suitable surfactants include non-ionic, anionic and cationic surfactants. TERGITOL®, TRITON GR7M®, TRITON X 100®), Triethylamine (TEA), AQUAQUEST 2120® (available from GEO Specialty Chemicals, Cedertown, Ga.) and water are exemplary. A preferred surfactant is TRITON X-100® (an octylphenoxypolyethoxyethanol nonionic surfactant) available from Union Carbide Chemicals and Plastics Company, Incorporated, Danbury, Conn. Surfactants are preferably employed in amounts of up to about 10%, by weight. Preferred ranges for amounts of surfactant are in the range of about 0–5%, by weight; more preferably about 0–1%, most preferably, surfactants are employed in amounts of about 0.05–0.25% by weight, based on the total weight of the composition.

The aqueous composition of the present invention can also include additives, such as pigments to provide colors. Suitable pigments include those of the organic type and those of the inorganic type. Preferred organic pigments include D and C Red, Nos. 10, 11, 12 and 13, D and C Red No. 7, D and C Red Nos. 5 and 6, D and C Red Nos.30 and 40, D and C Yellow No. 5 and D and C Red No. 2. Inorganic pigments include titanium dioxide, bismuth oxychloride, brown iron oxide and the red iron oxides.

The pigments may preferably be employed in amounts of up to about 5% by weight, preferably from about 0.01% to about 5% by weight, more preferably in amounts of from about 0.5% to about 2%, by weight.

Other ingredients may be added to accelerate drying. These include glycol esters, such as butyl glycol acetate, and volatile alcohols such as ethanol and 2-propanol. Drying accelerators may be added in amounts of from of up to about 5%, by weight, more preferably from about 0.01% by weight to about 5% by weight; more preferably from about 0.5% to about 2.5% by weight.

Other ingredients such as plasticizers and coalescing agents may also be employed. These include, for example, those disclosed in U.S. Pat. No. 5,716,603, which patent is hereby incorporated by reference as though set forth in full herein.

Thickeners may also be employed, in amounts in a range of from about 0.01% to about 5% by weight, for example. Suitable thickeners include cellulose and derivatives, including carboxymethylcellulose and hydroxyethyl cellulose, natural gums such as carrageenan, pectin and xanthan gum, silicates, clays, such as laponite and synthetic polymers such as ethylene oxide, vinyl alcohol, acrylic or polyurethane-type polymers, and the like.

Common practice has been to add fillers to the coatings to give properties of face durability, color and fire performance. However, a high amount of fillers (for example, 40% or greater by weight) will typically form a plate-like sealed surface on the board, which is desirable for face durability but will hurt the acoustical properties. They also prevent the coating from soaking into the board, and cause the paint to chip when a cut is made. Fillers also serve to "hide" the color of the substrate (in many compositions, the binder itself will not hide the substrate).

Additives can also be employed. The term "additives" includes a broad range of solid and liquid materials normally added to coating compositions. Suitable additives can be readily identified and employed by those of ordinary skill in the art. Additives include fillers, such as silicas, clays (including Kaolin, Ball, Delaminated, Calcined, etc.); calcium carbonate, titanium dioxide, pigments, optical brighteners, etc. When employed, additives may be employed in amounts in the range of from about 0–40%, based on total weight of the composition.

Suitable acids that can be used in combination with the composition of the present invention include, but are not limited to, fluoacid. Examples of fluoacid include, but are not limited to, fluotitanic acid, fluozirconic acid, fluosilicic acid and fluoboric acid, preferably fluotitanic acid and fluozirconic acid.

Uses of Composition

As discussed above, the aqueous compositions of the present invention can be used as additives for texture in paint, additives for engineered wood products, adhesives, binders for coating, control porosity of paper and textiles, dimensional stability control for paper, wood and textiles, dye fixative, edge seal, edge seal extenders for latices, hair styling, ink vehicles, latex replacement/extender, moisture barriers, paint binders, paint primers for all surfaces, paper coating additives, paper printability additives, paper size, paper strength additives (such as wet and dry additives, permanent press resins, porosity control, precoated for coated paper, primer for printing, protective coating, replacement for latex as an internal binder in all applications, sealants, stain resistance, surface modifiers for wood, metals and glass, textile strength, textile wet processing aids, and water resistance/repellency.

The aqueous compositions of the present invention are highly suitable for coating physiological substrates (e.g., nails and hair), porous substrates (e.g., wood and paper), cellulose substrates, textiles, and building materials (e.g., ceiling tiles, wall boards, sheet rocks, metals and the like).

The coating compositions of the present invention provide scratch, water and stain resistance, as well as other properties, such as maintaining flexibility, providing cuttability, durability, desired finished color, and resistance to aqueous liquids.

The aqueous composition of the present invention can also be used in dye fixatives, adhesives, sealants, cellulosic products to provide strength and/or texture. Examples of cellulosic products include, but are not limited to, ceiling tiles, paper products, non-woven products such as sheets, and paint. Non-woven products such as sheets can be natural are synthetic. Examples of non-woven products such as sheets include, but are not limited to, disposable diapers, disposable medical products, and absorbent pads.

The cellulosic product of the present invention preferably comprises a cured composition comprising components (A) and (B) in the amount of up to about 10% dry weight, more preferably about 0.005% to about 2% dry weight.

The ceiling tile of the present invention preferably comprises a cured composition comprising components (A) and (B) in the amount of up to about 20% dry weight, more preferably about 0.005% to about 2% dry weight.

The non-woven product of the present invention preferably comprises a cured composition comprising components (A) and (B) in the amount of up to about 20% dry weight, more preferably about 0.005% to about 15% dry weight.

The paint product of the present invention preferably comprises a cured composition comprising components (A) and (B) in the amount of up to about 25% dry weight, more preferably up to about 20% dry weight.

Uses of Composition in Metal Conversion Coatings

Although metal conversion coatings are generally known in the art, traditional chromate coatings have become uneconomical due to increased costs associated with industrial pollution concerns.

The compositions of the present invention are very suitable for use as chromium-free conversion coatings for metal surfaces, for example to improve corrosion resistance and adhesion of later-applied coatings on metals such as steel, galvanized steel, aluminum, zinc-aluminum coated steel and aluminum alloys. Such later-applied coatings can include paints, inks, lacquers, plastics and other siccative coatings. The inventive composition can be applied as an aqueous solution and can be used alone or with additives such as one or more of acetic acid, glycolic acid, and fluoacids such as dihydrohexafluotitanic acid, dihydrohexafluosilicic acid, dihydrohexafluozirconic acid, and fluoboric acid.

The manner of treating a metal surface can include applying an aqueous solution of the composition (e.g., up to about 90% by weight), and drying the composition in place on the surface or rinsing as by a water bath or shower, preferably drying the composition in place on the surface. An acid can beneficially be supplied in the solution to produce a pH of up to about 5. Suitable methods of application include spraying, immersion, flow coating, roll coating, and the like.

Corrosion resistance of the coated metals can be measured using the "Neutral Salt Spray" test; peel resistance can be measured by the "T-Bend" test, "Reverse Impact" test, or "Cross-Hatch" test. The MEK (methyl ethyl ketone) rub test is used to determine whether a paint has properly cured on a metal surface. These tests are detailed hereafter in the Example section.

Uses of Composition in Oriented Strand Board

The aqueous composition of the present invention can also be used in oriented strand board (OSB). "Oriented strand board" refers to a composite wood product based upon the use of special forms of wood flakes. Flake is a long, flat piece of wood that is about 1 to 4 inches (about 25–100 mm) in length. The length is in the longitudinal (grain) direction; the thickness is 0.010–0.040 inches (0.25–1.00 mm); and the width is variable. A flake has a length to thickness ratio of at least about 100.

OSB is produced by mixing dried flakes, or strands with resin adhesive, wax and other additives, and then forming the strands into mats on a wide screen caul. The strands are oriented in specific directions. The mat is then pressed, at temperatures up to about 218° C. (See Kirk-Othemer, Encyclopedia at Chemical Technology, Fourth Edition, Supplement Volume, J. Wiley ad Sons, (N.Y., 1998, pp 803–807).)

OSB is a reconstituted wood product. It provides a lower cost alternative to plywood and solid sawn wood and can be produced in a wide range of densities.

The pH of the emulsion used in oriented strand boards is at least about 4, preferably at least about 7.5, more preferably from about 8.8 to 11.5, and most preferably about 10.2.

Uses of Composition in Cellulosic Products

As used herein, "cellulosic products" is intended to refer to products containing cellulosic fibers, such as paper, paper board, cardboard and any related product. The following discussion concerning paper is illustrative and applies to all related materials and processes.

Paper is made by a process that includes preparing a paper making pulp or slurry, followed by forming the pulp or slurry into a membrane from which the paper sheet is eventually formed. The wet part (as this term is used herein) of the process includes all the stages in furnish preparation, including pulp blending and refining, through thick stock and thin stock blending, chemical additions and dilutions with both white water and fresh incoming water, to the point of deposition of fiber and membrane formation on the wire, at the wet end of the paper making process. Thus, the wet part of the process includes all stages of the paper making process through the formation of the sheet.

In the papermaking industry, it is common to attempt to optimize papermaking compositions in order to provide specific functional properties as efficiently and economically as possible. Such optimization can include the addition of compounds to any part of the wet portion of the process, as well as to any other portion of the process, including the formed or forming pulp as well as formed or forming paper. Typical compositions include (internal and external) sizing agents (materials) and wet and/or dry strength resins. As used herein, internal sizing refers to sizing associated with the addition of size at the wet part of the paper making process, and thus internal sizing or sizing at the wet part of the paper making process refers to the addition of size at any of the stages of the wet part of the process. Surface sizing refers to the addition of materials to the formed or forming pulp as well as formed or forming paper.

Wet and/or dry strength resins are a common additive to papermaking compositions. These materials act to provide strength to wet paper and are used in, among other paper products, paper towel and packaging. Among other uses, they are also useful as creping adhesives. Wet strength resins may be added during paper production to bind the cellulose fibers together, and to enhance the strength of the paper produced so that the paper does not fall apart when used under wet conditions. Wet and dry strength resins may be added during any part of the papermaking process including the wet part or may be added to formed pulp and formed paper.

Use of Composition as Coating for Ceiling Tiles

The coating of the present invention is highly suitable for ceiling boards (ceiling tiles), since the coating gives the coated board an improved face durability and cuttability. Although the coating can be used on a ceiling board of any suitable composition, the boards for which the present coating compositions have been found to be suitable comprise fiber in an amount in the range of from about 5 to about 85% by weight, filler in an amount in the range of from about 5 to about 90% by weight, and a binder in an amount in the range of from about 1 to about 25% by weight. Preferably, the board is an acoustical board comprising fiber in an amount in the range of from about 20% to about 80% by weight, filler in an amount in the range of from about 20 to about 75% by weight, and a binder in an amount in the range of from about 1 to about 20% by weight. In some aspects, the acoustical board comprises from about 10 to about 80% by weight of a fiber selected from at least one of mineral wool and cellulosic fibers, a filler at an amount in the range of from about 5 to about 90% by weight, said filler being selected from the group consisting of perlite and clay, and an organic binder at an amount in the range of from about 1 to about 20% by weight.

Some suitable acoustical boards which can be coated with the compositions described herein are described in and can be prepared in accordance with procedures described in U.S. Pat. No. 4,963,603 to FELEGI et al., assigned to Armstrong World Industries, Inc., which patent is hereby incorporated by reference as though set forth in full herein.

Coatings that produce an "1 beam" effect with such board are provided in accordance with preferred embodiments of the present invention. The invention provides a surface treatment to the board to make the surface strong, but also pliable when the board is cut. In some aspects, the "1 beam" effect results from configurations wherein each major surface of the board, such as two faces, are coated with a composition of the invention, leaving uncoated porous board material, such as that described above, therebetween.

While ceiling tile and wallboard material are typical of the building materials contemplated herein, these materials are considered to be representative of one type of substrate which is suitable to be coated by the compositions of the invention. Therefore, for ease of discussion, reference is made herein to ceiling tile, and in particular, acoustical ceiling tile; however, it will be readily understood that other substrates are similar, and all such materials are intended to be within the scope of the present invention.

Use of Composition as Coating for Porous Substrates

The coating compositions of the present invention are particularly suitable for porous substrates. This is especially the case in applications where it is desired to coat a porous substrate without substantially reducing the porosity of the substrate.

The coatings of the invention have particular utility in coating substrates having a porosity of at least about 50–95%, preferably about 85%-90%, based on the amount of air voids. Thus, for a substrate having a porosity of 90%, 90% of the substrate volume is made up of air holes while 10% is solid components. Preferably such substrates are open-celled.

Preferably, the compositions of the invention reduce the porosity of the substrate upon coating and curing by less than about 10%, more preferably less than about 5%, more preferably, less than about 2%, and most preferably less than about 0.5%.

Reduction in porosity can be measured by running an NRC test (described in the test section (Reverberation Room Sound Absorption Test) below) and determining the change after a coating of the invention has been applied to a substrate and cured. Using this test, the compositions of the invention should not change the rounded NRC number of substrates coated with compositions of the invention and cured, by more than about 15, in comparison with the uncoated substrate.

As discussed herein, certain properties are desirable with respect to building materials in general, as can be specifically illustrated with ceiling tiles in particular. For finished ceiling tile, these properties include the following:

Acoustical: the ability of the ceiling tile to control sound in and between rooms. The acoustical properties are measured in three ways CAC (Two room transmission loss), NRC (Reverberation room sound absorption), & AC (open room sound attenuation).

Color: typically white as the color and measured using the L and b color scales. L being the scale from black to white and b being the scale from blue to yellow. The instrument used to color measurement is the Hunter color meter, i.e. a Hunter Miniscan® 45/O-L Hunter Associates Laboratories, Reston, Va.

Face Durability: the ability of the surface of the board to resist scratches, and damage during normal installation and servicing the plenum. Measured by scrubbability, finger scratch resistance (i.e., Hess Rake test), and taber abrasion, all of which tests are described in detail in the section entitled "Standard Test Procedures Used in Examples".

Substrates coated with compositions of the invention and cured exhibit a Hess Rake value of at least about 8, preferably at least about 10, more preferably at least about 12, and most preferably at least about 14.

Substrates coated with compositions of the invention and cured exhibit a Taber Abrasion loss value of less than about 1 gram, preferably less than about 0.6 grams, more preferably less than about 0.4 grams, and most preferably less than about 0.2 grams.

Cuttability: The ease of the knife to cut through the board without chipping or flaking the coating. This is measured by the cuttability test. In this test, a straight cut is made in the center of the ceiling tile using a sharp razor blade. The cut is then covered with a 6 inch long piece of tape, having a width of 2", such that the length of the tape is aligned with the length of the cut and such that the width of the tape completely covers the cut, making sure to cover the end of the cut where the knife was withdrawn from the cut. The tape is then peeled off manually, while maintaining the rate of peel at a constant speed, and the number of paint chips which develop are counted. A cuttability number is then calculated: (#flakes/sq. inch)×10. This test simulates a tegular cut made during a field installation of a ceiling tile system—the lower the number, the better. Substrates, coated with a composition of the invention which is then cured, exhibit a cuttability value of less than about 15, preferably less than about 10, more preferably less than about 2 and most preferably less than about 1.

Sag: The ability of the board to maintain a flat and even surface when exposed to high humidity conditions. Measured using a controlled humidity chamber and deflection gage.

Fire performance: The resistance to flame spread. Measured by 30–30 tunnel test.

The addition of coatings to the substrate are often employed to obtain the desired properties of color, face durability, and fire performance. However, typically, the properties of acoustics, and cuttability are somewhat diminished once a coating is added.

Common practice has been to add fillers to the coatings to give properties of face durability, color and fire performance. However, a high amount of fillers (for example, 40% or greater by weight) will typically form a plate-like sealed surface on the board, which is desirable for face durability but will hurt the acoustical properties. They also prevent the coating from soaking into the board, and cause the paint to chip when a cut is made. Fillers also serve to "hide" the color of the substrate (in many compositions, the binder itself will not hide the substrate).

It has been unexpectedly discovered that compositions of the present invention achieve improved face durability while adding little or no fillers, such as the additives discussed above to the coating. As used herein, the term "little or no fillers" is intended to include compositions having less than about 15% fillers, more preferably, less than about 1%, based on the total weight of the composition. Ideally, the compositions of the invention have substantially no fillers.

Since little or no fillers are added, the viscosity of the coating remains low and thus the coating is allowed to penetrate and soak into the board. This effect has been observed in accordance with the present invention to be more of a thin and diluted coating, instead of a formed, "plated" coating. In other words, coatings of the invention penetrate porous structures rather than "plating" across the surface, such as by plating across openings. This keeps the "openness" of the surface of the board intact and does not diminish the acoustical properties of the substrate (or ceiling tile). The coating also gives enough "hiding power" to cover the color of the substrate upon subsequent application of a finish coating, such as a paint, even with little or no fillers. Thus, preferably, the coating may be clear in color, not significantly affect acoustics upon curing, but still provide enough of a coating effect so that subsequently applied coatings of, for example, paints so that the paint can cover and hide the color of the substrate.

Coating compositions of the invention preferably have a relatively low viscosity. In some aspects, coating compositions of the invention have a viscosity of 100 cps or less, preferably 50 cps, or less and most preferably 35 cps or less, as measured on a Brookfield viscosimeter using a No. 1 spindle, unless otherwise specified in specific example, at a temperature of 25° C. and spindle speed of 100 rpm to standard depth on the spindle.

It has been found that component (A) forms a clear coating which enables subsequent finish coats to hide the color of the substrate. This has been shown to be the case with HERCOBOND 5100® as component (A). HERCOBOND 2000®, HERCOBOND 1000® and HERCOBOND 5100°, alone or in combination with each other have also been found to form a clear coating which enables subsequent finish coats to hide the color of the substrate.

In some aspects, compositions of the invention provide coatings wherein the L and b values (L and b being discussed in the "color section" above) are substantially unchanged after application of the coating to the substrate followed by curing of the coating. By "substantially unchanged" in reference to L and b values herein is meant that the L value changes by less than about 5, preferably less than about 1; and the b value changes less than about 1, preferably less than about 0.1.

Advantages

The unexpectedly superior spectrum of properties provided by the compositions of the invention is more favorable than that which would be expected to be supplied by each component, separately, particularly in view of the fact that the resultant composition exhibits positive aspects of each the components, while certain negative aspects that would be expected by the use of each component, separately, are not exhibited.

In developing the invention, different compositions were attempted, including compositions of component (A) such as polyamidoamine-based compositions (without being combined with a copolymer of an alkyl chloride and a polyalkene); and including compositions of component (B), such as those based on emulsions of copolymers of alkyl chloride and polyalkene (without being combined with a polyamidoamide).

In particular, in experiments involving treating building material substrates with compositions comprising components (A) or (B) it was found that compositions based on emulsions of copolymers of alkyl chloride and alkenes, such as copolymers of vinyl chloride and ethylene, provided very good cuttability and no flaking or chipping; however, these compositions did not achieve the desired finished color in ceiling tile application (for example, there was no holdout from the primecoat, i.e., they did not hide the color of the substrate). Similarly, polyamidoamine-based compositions provided very good scratch durability and finish color, but provided poor results with regard to cutting or flaking. It was expected that these negative or poor aspects of the individual components would be retained by the combined composition. However, contrary to expectations, these poor aspects were not exhibited, but the desirable aspects were retained.

Primer Coatings

The compositions of the invention have particular utility as a primer coating, such as coatings which are applied to a newly-manufactured substrate. The primer coated substrates can then later be painted or further coated, either prior to or subsequent to installation.

Application of Composition

The compositions of the invention may be applied to substrates in any suitable way, such as by coating equipment, including spraying, brushing, roller application, and the like. Those of ordinary skill in the art can readily select a suitable application system. For building materials in general and ceiling tile in particular, the substrates may preferably be coated by spraying. Compositions of the invention may be applied in any amount suitable for the particular application. For ceiling tile, amounts in a range of from about 5 to about 50 grams of composition/square foot are suitable, preferably amounts of from about 10 to about 40 g/square foot, more preferably about 15 to about 25 g/square foot. 20 grams of coating composition per square foot of substrate has been found to be particularly suitable amount of application in accordance with the invention.

After application to the substrate, compositions of the invention may be preferably subjected to accelerated drying and curing. Any suitable drying arrangement may be employed to cure the coating. The only requirement is that the water be driven off so that curing takes place. The coated substrate may be dried in a drying oven at a temperature in the range of about 350° F. to about 460° F., preferably 350° to about 450° F. A temperature of about 450° F. has been found to be particularly suitable. Alternatives such as heat lamps without the use of specialized drying ovens may be employed alternatively, or in addition thereto.

The compositions of the invention exhibit stability over time. Thus, the compositions of the invention do not gel when stored at room temperature (20° C.) in a closed, sealed container for a period of at least about 2 weeks; preferably at least about 1 month.

Uses of Composition Other than Coating Composition

The composition of the present invention can also be used as binders, e.g., to adhere pigments in coating formation to the surface of papers. In addition, the use of the binders also provides cohesive strength to the pigment.

Preferably, when used as a binder, the composition of the present invention is an emulsion and has a ratio of component (A) to component (B) preferably from about 5:1 to about 1:5, more preferably from about 2:1 to about 1:1, and most preferably from about 169:1.

The pH of the emulsion is preferably greater than about 3, more preferably greater than about 6, and most preferably greater than about 7.5.

Without further elaboration, it is believed that one skilled in the art can, using the preceding description, utilize the present invention to its fullest extent.

The following preferred specific embodiments are, therefore, to be construed as merely illustrative, and not limitative of the remainder of the disclosure in any way whatsoever. In the following examples, all temperatures are set forth uncorrected in degrees Fahrenheit; unless otherwise indicated, all parts and percentages are by weight.

EXAMPLES

The following experiments are conducted in an effort to (1) improve the characteristics of building materials, in particular, resistance to water penetration; (2) improve properties of oriented strand board; (3) improve binding and adhesive strength properties of paper coatings; (4) test efficacy of different latices that could be used in the composition of the present invention; and (5) improve metal coatings. Test procedures for all tests referenced in this specification are also set forth following the report of the resultant data, at the end of the following Examples.

The tests were conducted on boards formed in accordance with procedures for fabricating ceiling boards (tiles). In such tests, coatings of the invention in the form of a prime coat were added to the substrate, followed by two coats of finish coating and subsequent testing. The prime coat is added after it has been textured or designed. This texture can rub off easily so a prime coat is added and evaluated, which provides a reliable indication of the performance of the coated tile in typical market/installation.

The following experiments are conducted in an effort to improve the characteristics of building materials, in particular, face durability and cuttability. Test procedures for all tests referenced in this specification are also set forth following the report of the resultant data, at the end of the following Examples.

Example 1

Evaluation of Formulations Containing Different Polymers and Latices

This example is directed to Samples 1–11 shown in Table 1 below. Specifically, this example illustrates properties of Samples 1–9 containing different latices, and Samples 10 and 11 containing different polymers.

Samples 1–9 are Prepared as Follows:

For Samples 1–9, a one liter of emulsion is prepared by adding 42.2 dry g of KYMENE® 557H wet strength resin (obtained from Hercules Incorporated, Wilmington, Del.) to 25 dry g of latex with mechanical stirring. 62.5 g of demineralized water is added to the emulsion to yield a slightly blue opaque white dispersion. The dispersion is then allowed to stir for 15 minutes at room temperature.

Samples 10 and 11 are Prepared as Follows:

Sample 10 is prepared using the procedures for preparing Samples 1–9 with the exception that Reten® (201 (dimethylamine-epichlorohydrin polymer) obtained from Hercules Incorporated, Delaware is used.

Sample 11 is prepared using the procedures for preparing Sample 10 with the exception that Reten® 203 (polyDADMAC (diallyldimethylammonium chloride)) obtained from Hercules Incorporated, Delaware is used.

The Brookfield viscosity of each Sample is initially measured and then measured again after one week (on the eighth day) using the Brookfield programmable LV DV-II and Viscometer Spindle #2, at 60 rpm and 25° C. The viscosity of each sample is recorded in Table 1.

Dispersion and color of each sample is also initially observed and then observed again after one week (on the eighth day) by naked eye and recorded in Table 1.

Application and General Observations for Aluminum and Wood

A 20-g aliquot of the emulsion of each of Samples 1–11 (prepared as discussed above) is absorbed onto a 4-inch by ½ inch paint roller and applied to 11 pieces of aluminum and 11 pieces of wood at the rate of 0.046 pounds per square meter.

The aluminum and wood pieces are then cured for 5 minutes at 150° C. The results are shown in Table 1 below.

TABLE 1

EVALUATION IN FORMULATION OF COMPONENTS (A) AND (B)

| Sample | Description | Latex Type | Total Solids (%) | Brookfield Viscosity (cps) Initial | 1 wk | Comments Dispersion | Film | Adhesion to Al/Wood |
|---|---|---|---|---|---|---|---|---|
| 1 | Neocar (Union Carbide) | Vinyl Ester/Acrylic | 14.6 | 52 | 47 | No Blue Hue-Stable | Opaque | Very strong/Good |
| 2 | Res 3077 (Rohm & Haas) | Vinyl Acetate/Acrylic | 14.6 | 39 | 34 | Slight Blue Hue - Stable | Opaque | Good/Good |
| 3 | Airflex 500 (Air Products) | Vinyl Acetate/Ethylene | 14.6 | 62 | 54 | Blue Hue-Stable | Opaque | Good/Good |
| 4 | Airflex 4514 (Air Products) | Vinyl Chloride Amide Terpolymer | 14.6 | 70 | 53 | Very Blue Hue - Stable | Clear | Good/Good |
| 5 | Airflex 4500 (Air Products) | Vinyl Chloride Amide Terpolymer | 14.6 | 70 | 52 | Very Blue Hue - Stable | Clear | Good/Good |
| 6 | Flexhane 620 (Air Products) | Urethane Hybrid | 14.6 | Agglom. | — | Agglomerated on addition | — | —/— |
| 7 | Vinac 884 (Air Products) | Vinyl Acetate | 14.6 | 44 | 40 | Slight Blue Hue | Opaque | Good/Good |
| 8 | Dow 620 (Dow) | SBR | 14.6 | 62 | 53 | Some PPT Blue Hue | Clear | Good/Good |
| 9 | Airflex 4530 (Air Products) | Polyamidoamine-epihalohydrin and ethylene vinyl chloride | 14.6 | 40 | 37 | Slight Blue Hue - Stable | Opaque | Good/Good |

TABLE 1-continued

EVALUATION IN FORMULATION OF COMPONENTS (A) AND (B)

| Sample | Latex Description | Latex Type | Total Solids (%) | Brookfield Viscosity (cps) Initial | Brookfield Viscosity (cps) 1 wk | Comments Dispersion | Comments Film | Adhesion to Al/Wood |
|---|---|---|---|---|---|---|---|---|
| 10 | Airflex 4530 (Air Products) | Polyamidoamine-epihalohydrin and ethylene vinyl chloride | 14.8 | 74 | — | Slight Blue Hue - Stable | Opaque | Fair/— |
| 11 | Airflex 4530 (Air Products) | Polyamidoamine-epihalohydrin and ethylene vinyl chloride | 14.8 | 278 | — | Slight Blue Hue - Stable | Opaque | Fair/— |

As shown in Table 1, different latices could be used to produce the composition of the present invention. In particular, with exception of Sample 6, all the Samples provide stable dispersion and form films.

Example 2

Application and General Observations for Use of Composition as Binders

This example illustrates that the composition of the present invention has excellent binding properties as compared to conventional binding compositions in the art.
Composition of the Present Invention:

A one liter of emulsion is prepared by adding 42.2 dry g of HERCOBOND® 5100 wet strength resin (obtained from Hercules Incorporated, Wilmington, Del.) to 25 dry g of DOW® 620 SBR (obtained from Dow Chemical Company, Midland, Mich.) with mechanical stirring. 62.5 g of demineralized water is added to the emulsion to yield a slightly blue opaque white dispersion. The dispersion is then allowed to stir for 15 minutes at room temperature.

The final product has a total solids of 14.6%.
Control Composition (Composition of Conventional Binding Composition):

A control coating formulation is prepared by adding 0.1 part of (0.5 g) sodium polyacrylate dispersant (Dispel N40 obtained from Allied Colloids, Suffolk, Va.) to 102 g of water under agitation. 100 parts of calcium carbonate (obtained from Omya Inc., Florence, Vt.), followed by the addition of 10 parts of a control composition (containing one liter of the emulsion prepared as described above (using HERCOBOND® 5100 and DOW® 620) at a reduced agitation rate. 0.3 parts of carboxymethylcellulose (CMC 9M31 obtained from Hercules Incorporated, Wilmington, Del.) is added and the mixture is stirred for several hours.

Brookfield viscosity of both the coating mixtures containing the composition of the present invention and the control composition are measured using a Brookfield viscometer (which is a product of Brookfield Engineering, Stoughton, Mass.) using a No. 5 spindle at 100 rpm of the coatings).

The Brookfield viscosity of the coating mixture containing the composition of the present invention is 234 cps. The Brookfield viscosity of the coating mixture containing the composition of the control sample is 214 cps.

Three drops of the coating mixture containing the composition of the present invention is placed on a first piece of bleached board. A second piece of bleach board is used to cover the first piece of bleached board to create a sandwich structure. A 5-lb weight is placed on the structure for about 18 hours at ambient temperature.

Three drops of the coating mixture containing the control sample is placed on a first piece of bleached board. A second piece of bleach board is used to cover the first piece of bleached board to create a sandwich structure. A 5-lb weight is placed on the structure for about 18 hours at ambient temperature.

Both of the sandwich structure prepared above are then separated by hand. The structure made with the composition of the present invention requires more force to separate. The structure with the control composition is easily separated and has a fragile dried film. In contrast, the structure with the composition of the present invention has excellent adhesive properties. In addition, the film formed by the composition of the present invention is not totally dried, and thus has water-holding properties.

Example 3

Application and General Observations for Use as a Conversion Coating for Metal

This example is directed to Samples 1–8 in Table 2 below and illustrates Neutral Salt Spray (NSS) performance and physical durability of painted metal panels.
Each of Samples 1–5 is Prepared as Follows:

A one liter of emulsion is prepared by adding 42.2 dry g of KYMENE® 557H wet strength resin (obtained from Hercules Incorporated, Wilmington, Del.) to 25 dry g of Airflex® 4530 with mechanical stirring. 62.5 g of demineralized water is added to the emulsion to yield a slightly blue opaque white dispersion. The dispersion is then allowed to stir for 15 minutes at room temperature.

The dispersion has a total solids of 14.6%, pH of 4.5 to 5.0, and a Brookfield viscosity of 28 centipoise at 25° C. (The Brookfield viscosity is measured using the Brookfield programmable LV DV-II and Viscometer Spindle #2, at 60 rpm and 25° C.)

For each of Samples 1–5, the dispersion (prepared as described above) is added to 0.30 weight percent of fluozirconic acid (obtained from Allied Signal). The amount of the dispersion used to prepare each of Samples 1–5 is: 0.7 weight %, 3.4 weight %, 6.75 weight %, 33.8 weight %, and 84.5 weight % (respectively).
Samples 6–8:

Sample 6 contains 0.30 weight %. by volume of fluozirconic acid.

Sample 7 contains 10% by volume of Permatreat 1500 which is a chrome no-rinse treatment obtained from BetzDearborn.

Sample 8 has 15% by volume of Permatreat 1021B which is a non-chrome treatment obtained from BetzDearborn.

Hot-dipped galvanized metal panels are obtained from ACT Corp and cleaned with BetzDearborn KL4010, a commercial alkaline cleaner available from BetzDearborn. The metal panels are rinsed with deionized water for 5 seconds, and subsequently coated with Samples 1–8 by spin coat application, followed by forced air drying. Duplicate panels are coated for each sample.

The treated panels are painted with a two-coat paint typically used in coil applications, available from Akzo-Nobel. The primer and top coat are applied and cures according to the manufacturers specifications.

The coated metal panels then undergo NSS testing, T-Bend, Cross-Hatch, Reverse Impact, and methyl ethyl ketone (MEK) double rub testing. The metal panels are observed and the results are shown in Tables 2 (NSS) and 3 (other test data).

Neutral salt spray results are reported in Table 2 as scribe, field. In addition, Table 2 recites "/" for results of duplicated metal panels coated with each sample (as shown in column 5 of Table 2). Results are for duplicate panels and are rated as per ASTM D-1654 (with 10 being perfect); T-Bend data describes the tendency for paint to disadhere from a 180° bend in the metal measured according to ASTM D4145–83 (wherein 0T is perfect); Cross-Hatch data describes the tendency to disadhere from areas between closely spaced lines through the paint. The test was done dry according to ASTM D3359 (from a 0B to 5B scale, wherein 5B is perfect); Reverse Impact data describes the tendency of paint to disadhere from metal deformed by an impact of known momentum on the reverse side of the test surface according to ASTM D2794; MEK rub data describe whether the paint is cured properly and is described in National Coil Coaters' Association (NCCA) Method II-18.

TABLE 2

NSS data for painted panels

| Sample | 336 Hrs. | 500 Hrs. | 672 Hrs. | 840 Hrs. | 1000 Hrs. |
|---|---|---|---|---|---|
| 1 | 9, 9 | 9, 9 | 7, 9 | 9, 7(4) | 7/7, 5/7 |
| 2 | 9, 9 | 9, 9 | 8, 9 | 8, 8(6) | 8/8, 8/7 |
| 3 | 10, 10 | 9, 10 | 8, 9 | 7, 9 | 9/9, 9/8 |
| 4 | 9, 10 | 9, 10 | 8, 8 | 9, 9 | 7/9, 8/7 |
| 5 | 8, 10 | 7, 9 | 8, 9 | 6, 9 | 5/5, 8/9 |
| 6 | 10, 10 | 9, 10 | 9, 9 | 9, 9 | 7/4, 5/8 |
| 7 | 10, 10 | 9, 10 | 9, 10 | 9, 9 | 9/9, 9/8 |
| 8 | 10, 10 | 9, 10 | 9, 9 | 10, 10 | 9/9, 9/8 |

TABLE 3

Physical Durability

| Sample | T-Bend | Cross-Hatch | Rev. Imp. (In/lb) | MEK rubs |
|---|---|---|---|---|
| 1 | 0T | 5B | 160160 | 100+ |
| 2 | 0T | 5B | 160 | 100+ |
| 3 | 0T | 5B | 160 | 100+ |
| 4 | 0T | 5B | 160 | 100+ |
| 6 | 1T | 5B | 160 | 100+ |
| 7 | 0T | 5B | 160 | 100+ |
| 8 | 1T | 5B | 160 | 100+ |

Example 4

Application and General Observations for Use as a Conversion Coating for Metal

This example is directed to Samples 1–4 and 6–8 shown in Table 4 below. The procedure for preparing Samples 1–4 is the same as Samples 1–4 in Example 3 with the exception that 0.45 weight % of fluozirconic acid is used. Samples 6–8 are prepared using the same procedures for preparing Samples 6–8 in Example 3. The data in Table 4 is for a one-coat black polyester paint obtained from PPG.

TABLE 4

| Sample | T-Bend Test (ASTM D4145-83) | Cross-Hatch Test (ASTM D3359) | Reverse Impact Test (in/lb, ASTM D2794) | MEK Rubs (NCCA II-18) | 1000 Hours Neutral Salt Spray* (ASTM B171654) |
|---|---|---|---|---|---|
| 1 | 0T | 5B | 160 | 95 | 1/1, —/— |
| 2 | 0T | 5B | 160 | 100+ | 0, 0 |
| 3 | 0T | 5B | 160 | 100+ | —, — |
| 4 | 0T | 5B | 160 | 100+ | 5/5, 7/4 |
| 6 | 2T | 5B | 160 | 44 | 2/2, 6/6 |
| 7 | 0T | 5B | 160 | 100+ | 7/7, 9/9 |
| 8 | 1T | 5B | 160 | 100+ | 3/4, 9/8 |

*Neutral salt spray results are reported as scribe, field; "—" denotes a sample which ranked below 2; and "/" denotes results of duplicate panels.

Example 5

Evaluation of Potential Materials for Precoat

The following materials were evaluated:

KYMENE 557H® (available from Hercules Incorporated, Wilmington, Del.)

KYMENE 450® (available from Hercules Incorporated, Wilmington, Del.)

HERCOBOND 1000® (available from Hercules Incorporated, Wilmington, Del.)

HERCOBOND 2000® (available from Hercules Incorporated, Wilmington, Del.)

HERCOBOND 5100® (available from Hercules Incorporated, Wilmington, Del.)

PICCONAL AA101® (thermoplastic resin available from Hercules Incorporated, Wilmington, Del.)

PICCOTAC 95–55wk® (thermoplastic resin available from Hercules Incorporated, Wilmington, Del.)

TACCOLYN 5001 ® (thermoplastic resin available from Hercules Incorporated, Wilmington, Del.)

AIRFLEX 4530® (available from Air Products and Chemicals, Allentown, Pa.)
AIRFLEX320® (available from Air Products and Chemicals, Allentown, Pa.)
FLEXBOND 325® (available from Air Products and Chemicals, Allentown, Pa.)
CHARTWELL® B523.6WH (as an additive, available from Chartwell, International, Attleboro Falls, Mass.)
HYCAR 26256 (available from BF Goodrich, Ohio)
AZC (Ammonium Zirconium Carbonate, from Hopton Technologies, Albany, Oreg.).
LUCIDENE® 243 (available from Morton International, Chicago, Ill.)
LUCIDENE® 245 (available from Morton International, Chicago, Ill.)
MORKOTE® 1725 (available from Morton International, Chicago, Ill.)
TRITON X-100 (available from Union Carbide Chemicals and Plastics Company, Incorporated, Danbury, Conn.)

Testing of the different materials was performed on boards that were taken from the production line before the surface was painted with anything but after being textured or designed. The grade used for testing was standard grade, 0.710 inches thick SAG from the Armstrong World Industries Beaver Falls plant. The boards were then hand sprayed using the chemicals from the above listing, as described in Table 5, below. After spraying, the boards were put through a fabrication dryer to dry the coating (oven temp range 400–460° F.). The boards were then finished with 2 coats of finishing paint (standard water-based paint of about 48 wt% solids for finishing ceiling tile) and oven dried at a temperature in the range of 400–460° F., and set aside for testing.

The testing was directed to three parameters for grading the products. They are: scratch test using the HESS rake (also referred to as a finger rake), cut test with a razor knife, and color. The cut and scratch tests are somewhat subjective but provide a very good feel for how the different products compare. The results are set forth in Table 5, below.

TABLE 5

| Test Series | Experiment No. | Product used | % | Grams applied per sq. ft | L | b | Scratch (HESS) | cut | Comments |
|---|---|---|---|---|---|---|---|---|---|
| A | 1 | Airflex 4530 | 10 | 20 | | | 16 | 3 | |
| | | Water | 52.3 | | | | | | |
| | | Clay Fillers | 36.9 | | | | | | |
| | | (Control Paint) | | | | | | | |
| | 2 | Airflex 4530 | 44.44 | 20 | | | 20 | 5 | |
| | | Water | 55.31 | | | | | | |
| | | Triton X-100 | 0.25 | | | | | | |
| | | (Airflex Precoat) | | | | | | | |
| | 3 | Flexbond 325 | 44.44 | 20 | | | 18 | 4 | |
| | | Water | 55.31 | | | | | | |
| | | Triton X-100 | 0.25 | | | | | | |
| | 4 | Airflex 4530 | 6 | 20 | | | 16 | 3 | |
| | | Water | 48 | | | | | | |
| | | Clay Fillers | 46 | | | | | | |
| | 5 | Piccotac 95-55 wk | 100 | 20 | | | 16 | 3 | |
| | 6 | Airflex 4530 | 10.5 | 20 | | | 18 | 3 | |
| | | Water | 50.8 | | | | | | |
| | | Clay Fillers | 35.8 | | | | | | |
| | | Chartwell 3523.6WH | 2.9 | | | | | | |
| | 7 | Hycar 26256 | 44.44 | 20 | | | 20 | 4 | |
| | | Water | 55.31 | | | | | | |
| | | Triton X-100 | 0.25 | | | | | | |
| | 8 | Airflex 4530 | 10.00 | 20 | | | 16 | 3 | |
| | | Water | 48.40 | | | | | | |
| | | Clay Fillers | 34.20 | | | | | | |
| | | AZC (Ammonium Zirconium Carbonate) | 4.60 | | | | | | |
| | | Chartwell B523.6WH | 2.80 | | | | | | |
| | 9 | Airflex 4530 | 10.3 | 20 | | | 16 | 3 | |
| | | Water | 49.8 | | | | | | |
| | | Clay Fillers | 35.1 | | | | | | |
| | | AZC | 4.8 | | | | | | |
| | 10 | Airflex 4530 | 10.77 | 20 | | | 16 | 4 | |
| | | Water | 52.17 | | | | | | |
| | | Clay Fillers | 36.81 | | | | | | |
| | | Triton X-100 | 0.25 | | | | | | |
| B | 1 | Picconal | 100 | 20 | | | 20 | 1 | |
| | 2 | Lucidene 243 | 44.44 | 20 | | | 22 | 4 | |
| | | Water | 55.31 | | | | | | |
| | | Triton X-100 | 0.25 | | | | | | |
| | 3 | Airflex 4530 | 10.8 | 20 | | | 18 | 3 | |
| | | Water | 52.3 | | | | | | |
| | | Clay Fillers | 36.9 | | | | | | |
| | | (Control) | | | | | | | |
| | 4 | Airflex 4530 | 42.32 | 20 | | | 20–22 | 5 | |
| | | Water | 52.68 | | | | | | |
| | | Triton X-100 | 0.24 | | | | | | |
| | | AZC | 4.76 | | | | | | |
| | 5 | Airflex 4530 | 44.44 | 20 | | | 20 | 5 | |
| | | Water | 55.31 | | | | | | |

TABLE 5-continued

| Test Series | Experiment No. | Product used | % | Grams applied per sq. ft | L | b | Scratch (HESS) | cut | Comments |
|---|---|---|---|---|---|---|---|---|---|
| | | Triton X-100 (Airflex Precoat) | 0.25 | | | | | | |
| | 6 | Airflex 4530 | 10.3 | 20 | | | 16 | 3 | |
| | | Water | 49.8 | | | | | | |
| | | Clay Fillers | 35.1 | | | | | | |
| | | AZC | 4.8 | | | | | | |
| | 7 | Morkote 1725 | 44.44 | 20 | | | 20 | 4 | |
| | | Water | 55.31 | | | | | | |
| | | Triton X-100 | 0.25 | | | | | | |
| C | 1 | Piccotac | 100 | 10 | | | −16 | 2 | |
| | 2 | Piccotac | 100 | 20 | 86.7 | 2.1 | −16 | 2 | |
| | 3 | Taccolyn | 100 | 10 | 86.7 | 2.5 | −16 | 2 | |
| | 4 | Taccolyn | 100 | 20 | 88.9 | 1.1 | −16 | 3 | |
| | 5 | Picconal | 100 | 10 | 86.4 | 2.2 | −16 | 3 | |
| | 6 | Picconal | 100 | 20 | 86.7 | 2.1 | −18 | 3 | |
| | 7 | Airflex 4530 | 44.44 | 20 | 88.4 | 2 | 20 | 4 | |
| | | Water | 55.31 | | | | | | |
| | | Triton X-100 | 0.25 | | | | | | |
| | 8 | Kymene 450 | 100 | 20 | 88.8 | 3.6 | −16 | 3 | |
| | 9 | Hercobond 5100 | 100 | 20 | 92 | 1.8 | 18 | 3.5 | |
| | 10 | Hercobond 1000 | 100 | 20 | 91.7 | 1.6 | −20 | 3.5 | |
| | 11 | Hercobond 1000 | 100 | 40 | 93.6 | 1.3 | 22 | 3.5 | |
| | 12 | Hercobond 2000 | 50 | 40 | 93.2 | 1.4 | 22 | 3.5 | |
| | | Water | 50 | | | | | | |
| | 13 | Hercobond 1000 | 50 | 20 | 88.9 | 2.7 | −16 | 4 | |
| | | Kymene 450 | 50 | | | | | | |
| | 14 | Hercobond 2000 | 16.7 | 20 | 90.3 | 3.9 | −18 | 3 | |
| | | Kymene 450 | 66.6 | | | | | | |
| | | Water | 16.7 | | | | | | |
| | 15 | Hercobond 5100 | 66.6 | 20 | 92.3 | 1.3 | 16 | 3.5 | |
| | | Hercobond 2000 | 16.7 | | | | | | |
| | | Water | 16.7 | | | | | | |
| D | 1 | Hercobond 5100 | 99.8 | 20 | 91.9 | 1.8 | 18 | 4 | |
| | | Triton X-100 | 0.2 | | | | | | |
| | 2 | Hercobond 5100 | 75 | 20 | 91.8 | 2.1 | 20 | 5 | |
| | | Airflex 4530 | 11.11 | | | | | | |
| | | Triton X-100 | 0.06 | | | | | | |
| | | Water | 13.83 | | | | | | |
| | 3 | Hercobond 5100 | 50 | 20 | 91.4 | 1.9 | 18 | * | board was wet |
| | | Airflex 4530 | 22.22 | | | | | | |
| | | Triton X-100 | 0.12 | | | | | | |
| | | Water | 27.66 | | | | | | |
| | 4 | Hercobond 5100 | 25 | 20 | 89.4 | 1.7 | 18 | 4 | |
| | | Airflex 4530 | 33.33 | | | | | | |
| | | Triton X-100 | 0.18 | | | | | | |
| | | Water | 41.48 | | | | | | |
| | 5 | Water | 97 | 20 | 91.8 | 2.7 | −18 | | |
| | | Triton | 3 | | | | | | |

Notes:
1) "—" preceding number indicates approximate value.
2) "*" indicates inconclusive results In the above Table 5, four series of tests (A–D) were conducted; each series being conducted during a separate test session. The first series, A, was conducted to evaluate how the material cut (distinct from "cuttability test" discussed elsewhere herein) and to evaluate the specimen in terms of the HESS rake test.

The color test was started later, only after initial testing showed good strength results. In initial tests, although not reflected in the table, color deviation was not acceptable (e.g., for L, a value of +/−5 away from the desired standard and for b, a value of +/−1 away from the desired standard), showing poor light reflectance and yellow color. The results for the tests should be interpreted as follows: Scratch test (Hess Rake test)—the higher the number the better. Cut test—the higher the number the better 5 being the best for that series and 5 being essentially no chips per square inch, 4 being 1 or 2 chips per square inch. With respect to color, the goal is to achieve a white value of: L from about 92 to about 93; b of about 1.6 to about 2.4, after application of the finish coats (that is, after application of finish coats over or on top of the coatings of the invention).

The above data demonstrate that the AIRFLEX precoat (formula A2) provided the best scratch and cut numbers but did not optimize the ability of the finish coat to hide the color of the substrate when the finish coat was applied over the coating of the invention. The HERCOBOND 5100® (formula C9) provided good scratch numbers and good color numbers. The most promising results include those at a weight ratio of 75% HERCOBOND 5100® and 11% AIRFLEX 4530®, remainder water and surfactant (formula D2, for example).

Certain of the resins tried failed due to the high heats used in the ovens which darkened the boards and the prime coat to the point where the two coats of finishing paint could not hide it. Additionally, certain resins were too brittle after drying to accomplish the goals given. The KYMENE 450® did have color issues as well, and did not perform as well for the strength. The HERCOBOND 2000® gave good results on the board except for cut, but it was difficult to spray the product on to the board. This property would be expected to be extremely undesirable from the standpoint of the spray operator. The HERCOBOND 1000 gave good results except for cut.

Example 6

The following illustrates how the coating of the invention imparts two types of improved durability on ceiling tile product: improved face durability and improved adhesion/cutting/flaking characteristics. Face durability is measured by the Hess Rake/Finger scratch (BF.5), Taber abrasion (A7), Scrubbability (BS.10), and Ball hardness (BH.10) tests. These tests simulate the repetitive motion of moving ceiling tiles out of the grid for access to heating, ventilation, electrical systems, and plumbing. Adhesion/cutting/flaking is measured by cuttability test or the six inch tape test, discussed above.

As shown in Example 5, the coatings of the invention were developed from coating systems which showed promise in lab testing. One type of coating (A2), was a dilute penetrant solution of AIRFLEX 4530®, water, and TRITON X-100®. As shown in Example 5, this coating provided good face strength durability and cutting, but poor color numbers (L and b values). Another coating was non-diluted HERCOBOND 5100®. This coating provided good face strength durability and color numbers, but poorer cutting characteristics. The two different chemistries were then combined. It was found that at a weight ratio of 75% HERCOBOND 5100® and 11% AIRFLEX 4530® (remainder surfactant and water, formula D2), optimum face durability, cuttability and color numbers were achieved.

The data below are for coating samples of the invention that were prime coated in laboratory conditions and finished under normal manufacturing conditions (i.e., at the Armstrong World Industries, Beaver Falls commercial plant). Sanded, dry material from the wet end were cut down into 2ft×2ft samples and then, after being designed, hand sprayed with 20 g/sqft of the coating. The coating was applied in place of a normal prime coat. The boards were then dried in fabrication ovens (400–460° F.), and coated as normal on-line with two coats of finish paint. The results are set forth in Table 6.

TABLE 6

|  | Control Prime Coat[1] | Test Coating[2] |
|---|---|---|
| Hess Rake Test | 16 | 20 |
| Cuttability | 16.7 | 3.3 |
| Small Scale Fire (Ring Test) | Pass | Pass |
| Loss On Ignition | Pass | Pass |
| Volatiles | Pass | Pass |
| Specific Gravity | Pass | Pass |

[1]Airflex 4530 ® 10.8 wt. %; Water 52.3 wt. %; Fillers (clay) 36.9%.
[2]Hercobond 5100 ® 75 wt. %; Airflex 4530 ® 11.11 wt. %; Triton X-100 ® 0.06 wt. %; water 13.83 wt. %.

The samples were then further tested by different personnel. The results are set forth in Table 7.

TABLE 7

|  | Normal prime coat[1] | Test Coating[2] |
|---|---|---|
| Taber Abrasion | 0.7078 | 0.0280 |
| Hess Rake | 12 | 16 |

TABLE 7-continued

|  | Normal prime coat[1] | Test Coating[2] |
|---|---|---|
| Scrubbability | 6 | 10 |
| Ball Hardness | 68 | 71 |

[1]Airflex 4530 ® 10.8 wt. %; Water 52.3 wt. %; Fillers (clay) 36.9%.
[2]Hercobond 5100 ® 75 wt. %; Airflex 4530 ® 11.11 wt. %; Triton X-100 ® 0.06 wt. %; water 13.83 wt. %.

Example 7

The next example illustrates scale-up for a capability study. For this test, the coating was substituted in place of a conventional prime paint on a production line. The coating was sprayed onto the board and dried on-line, then finished as normal on the fabrication line. The coating formulation was the same as in the lab scale tests—75% HERCOBOND 5100®, 11.11% AIRFLEX 4530®, 0.06% TRITON X-100®, and 13.83% water. The application rates were as follows:

Test Material—20 g/sqft coating of the invention, prepared by mixing at room temperature in a 150 gal mixer the components of formula D2 to make 100 gals total, 48 g/sqft finish paint Control Material—20 g/sqft prime paint, 43 g/sqft finish paint Again, improved face durability and cuttability were achieved, as indicated in Table 8:

TABLE 8

|  | Control material[1] | Test Material[2] |
|---|---|---|
| Taber Abrasion | 0.0347 | 0.0251 |
| Hess Rake | 12 | 16 |
| Ball Hardness | 82.0 | 79.2 |
| Scrubbability | 63 | 87 |
| Cuttability | 7.5 | 0.8 |

[1]Airflex 4530 ® 10.8 wt. %; Water 52.3 wt. %; Fillers (clay) 36.9%.
[2]Hercobond 5100 ® 75 wt. %; Airflex 4530 ® 11.11 wt. %; Triton X-100 ® 0.06 wt. %; water 13.83 wt. %.

Example 8

This example illustrates that the coatings of the invention can be applied to a porous type fiber substrate (such as a ceiling tile) and impart durability properties to that substrate without sealing it off, losing porous properties (such as acoustics) or detracting from the aesthetics, while still maintaining a Class A fire performance, and yet not undesirably impacting the sag performance of the tile. Acoustic properties were measured by CAC (AL20), NRC (AL10), and AC (AL60) tests, while fire properties were measured by a 30/30 Tunnel test (A5.21). The results are set forth in Table 9.

TABLE 9

|  | Control Material[1] | Test Material[2] |
|---|---|---|
| NRC (4 frequency average) | 0.75 (0.755) | 0.75 (0.755) |
| CAC | 36 | 36 |
| AC (OPL) | 180 | 170 |

TABLE 9-continued

|  | Control Material[1] | Test Material[2] |
|---|---|---|
| Flame Spread Rating | 11.5 | 17.3 |
| Sag | −75 (mils) | −53 (mils) |

[1]Airflex 4530 ® 10.8 wt. %; Water 52.3 wt. %; Fillers (clay) 36.9%.
[2]Hercobond 5100 ® 75 wt. %; Airflex 4530 ® 11.11 wt. %; Triton X-100 ® 0.06 wt. %; water 13.83 wt. %.

Without intending to be bound by theory, it is believed that these values are accomplished because of the low solids level in the coatings, along with the crosslinking capability of the HERCOBOND 5100® under heat. The low solids level allows the coating to soak into the substrate, giving good adhesion/cuttability, yet does not hinder the acoustics of the material. The HERCOBOND 5100® alone crosslinks with itself under heat to form a rigid durable layer. By adding a small amount of modifier, such as AIRFLEX 4530® to the coating, it is believed that the amount of HERCOBOND 5100® crosslinking is hindered, providing flexibility and better cutting/flaking properties. The physical properties of representative coatings are set forth in Table 10:

TABLE 10

| Loss on Ignition | 100% |
|---|---|
| Percent Solids | 15.6% |
| Percent Volatiles | 84.4% |
| Weight per Gallon | 7.91 lbs |
| Specific Gravity | 0.94 |

EXAMPLE 9

Flexibility Test

A composition of the invention (D2 in TABLE 5) was prepared. 50 g of the composition was poured onto the interior bottom surface of an aluminum pie pan (9" diameter). The pie pan was then placed in a drying oven for a sufficient period of time to drive off all of the water moisture at that temperature (about 3 hours). The resultant cured coating on the bottom of the pan had a thickness of about 5–10 mils and was firmly adhered to the bottom of the pan.

The pan with coating adhered thereto was then bent back upon itself so that the bend in bottom of the pan had an overall angle of substantially about 180°. At this extent of bending, the coating had still not delaminated or otherwise separated from the pan, and the coating exhibited substantially no visible cracking. The pan was then re-flattened and the bend was continued until the pan was again bent 180° from the flat configuration, in the direction opposite that of the first 180° bend (thus the total excursion, combining both bends was substantially 360°). Again, the coating had still not delaminated or otherwise separated from the pan, and the coating exhibited no visible cracking.

It was possible to cut the coating with a knife and separate cut pieces from the remainder in the pan by prying the coating up with the knife.

STANDARD TEST PROCEDURES USED IN EXAMPLES

Reverberation Room Sound Absorption (A110)
References: ANSI/ASTM C 423-90a, E 122, E 548, E 795; ANSI Standard S 1.6, S 1.26, S 1.11, ISO R 354-1963.
Purpose: To determine the ability of a test specimen to absorb sound in a laboratory control and reverberant and diffuse environment.
Sample Preparation:
Employ sufficient material for at least 8'×8' ceiling installation. Wall materials should be a sufficient amount to install in a 7.5'×9' area when the samples are 30" wide or an 8' by 9' area when the samples are 24" wide. Samples smaller than 46ft² are not to be employed for this test.
Test Parameters:
The type of mounting(s) employed should be consistent between samples. The following mounting systems may be employed, as long as consistent between samples being prepared:
E-400 Mounting—16" airspace behind sample.
Results:
NRC (Noise Reduction Coefficient) which is the single number determined by averaging the absorption coefficients at 250 Hz, 500 Hz, 1000 Hz, and 2000 Hz and rounding to the nearest 0.05. The absorption coefficients at ⅓ octave intervals between 100 Hz and 5000 Hz. When the specimen is a number of objects, such as free-standing screens or baffles, the results are reported in Sabius Per Unit.
Two Room Transmission Loss (A120)
References: ASTM Designation:
E 1414-91a, C 423, C 634, C636,
E90, E336, E413, E548, E717;
ANSI Standard S 1.11-1986;
AMA 1-II-1967
Purpose: To measure sound attenuation provided by a suspended ceiling in the presence of a continuous plenum space under prescribed laboratory conditions.
Sample Preparation:
Sufficient material to install in two test rooms of approximately:
 416 sq. ft. for 2×2 boards
 448 sq. ft. for 2×4 boards
 37.5 sq. meters for 600×600 boards
 40.5 sq. meters for 600×1200 boards
Test Parameters:
The type of grid is to be consistent between samples. The standard grid types are:
 15/16" T-Bar
 9/16" T-Bar
 Metric Wide and Metric Narrow
 Bolt Slot
Results:
The normalized attenuation values at each ⅓ octave band to the nearest 1 dB. The total number of deficiencies from the criterion curve and the calculated CAC value obtained from the test are reported.
Open Plan Sound Attenuation (A160)
References: ASTM Designation: E 1111-88, E 1375-90, E 1376-90, C 423, C 634, E 795, E 1110, E 1130, E 1179; ANSI Standards S 1.4, S 1.6, S 1.11, S 1.12
Purpose: To objectively measure the specimen's ability to attenuate sound in an open plan space.
Sample Preparation:
 1. Furniture Panel: The sample height should be at least 5 feet high and no greater than 8 feet high. The width of the sample should be at least 2 times the height but no greater than 20 feet wide. Supports for the sample and joint details should be consistent between samples.
 2. Wall Finishes: Sufficient material to cover a 9 feet high by 10 feet wide hard reflecting surface is required. The mounting method should be consistent between samples. Sufficient fiberglass material to be installed in the ceiling of the test space to a thickness of 6 inches may be employed, if consistent between samples.

3. Ceilings: A minimum amount of material to cover a 15 feet by 30 feet area is required. In some cases, a 20 feet×30 feet area may be required.

Results:

The measured interzone attenuations to the nearest 1 dB for all positions and frequencies examined. The normal interzone attenuations and the Articulation Class values will be reported.

Sag—Standard Cycle (BS. 5)

References: New Method Pending

Purpose: To determine the effects of humidity, temperature, and gravity on the deformation characteristics of ceiling materials in an installation position.

Sample Preparation:

Employ three 2 ft×4 ft specimens; four 2 ft by 4 ft specimens for face-up testing.

Test Parameters:

Boards are placed in a face down position.

One cycle consists of 17 hr @ 82 F/90% RH and 6 hr @ 82 F/35% RH.

Center point deflection is measured initially and after each segment of the cycle.

Typically, four sag cycles run per week.

Boards may be subjected to multiple cycles if consistent between samples

Inverted sag testing (face-up) is available if consistent between samples

Three determinations

Estimated Time:

Elapsed Time=3 days.

Results: Initial, Hot-Wet, Final deflection readings (mil) and vector data if face up testing is required. RH data throughout the cycle may also be tracked.

Scrubbability (BS. 10)

References: Federal Standard 141A, Method 6142; MEP 138 R.1

Purpose: To measure the resistance of a coating, such as paint on a ceiling tile, to hand washing by a consumer.

Sample Preparation: Submit one 12"×12" specimen.

Test Parameters:

Sample is cut to fit the Gardner Straight Line Washability Machine.

A hard bristle brush is used to scrub the board.

A 0.5% solution of Ivory Flakes is used to keep the board wet during the test.

The number of cycles at the first sign of breakthrough is recorded.

The test is continued until 50% failure or 150 cycles, whichever occurs first.

One determination: 17 inches long×7 inches wide hexagonal specimen.

Results:

Number of cycles to initial breakthrough, total number of cycles, and visual specimen valuation as per the following rating system:

| No Breaks | =0% | =A |
| Slight | =0–10% | =B |
| Moderate | =10–25% | =C |

-continued

| Extensive | =25–50% | =D |
| Very Extensive | =50–100% | =E |

Finger Scratch Resistance (BF.5) (Hess Rake Test)

References: TM 334

Purpose: To determine the durability/damage resistance of paint systems or surface treatments applied to ceiling materials.

Sample Preparation: Submit one 2–½ inch×8 inch specimen.

Test Parameters:

A "Hess Rake" is employed, which comprises 5 spring steel tines or fingers configured generally in a rake-like fashion. Each tine has a different thickness, measured and reported in mils, and has a rounded end and generally rounded cross-section, and is generally finger shaped. The rake is suspended on a track above the sample so that the tips of the tines barely touch the sample and the rake is then moved along the track so that tips of the tines are dragged along the surface of the sample with slight pressure on the surface.

Observations are made for initial paint breakthrough.

Results:

Thinnest finger at which paint breakthrough occurs (reported in mils corresponding to the diameter of the particular finger) is the Hess Rake value. The higher the number, the better.

Hardness—Acoustical Products (BH. 10)

References: ASTM C 367

Purpose: To determine the ability of ceiling panels to resist indentation caused by impacts.

Sample Preparation: Submit five 4"×4" specimens or one 12" by 12".

Test Parameters:

A specimen is placed flat under the penetrator of the test machine (universal test machine, Instron Corporation, Canton, Mass.).

A 2" diameter steel ball is forced into the surface of the specimen to a depth of 0.25" at a rate of 0.10"/min.

The load at this point is recorded as the hardness of the specimen.

Results:

Hardness (1b).

NOTE: Only specimens of the same thickness may be directly compared, since hardness varies with thickness.

Tunnel Test 30-30 (AS.21)

References: TM 179 R.4

Purpose: To determine the surface flame spread characteristics of materials.

Sample Preparation: Submit three 3¾"×29 ⅞" specimens.

Test Parameters:

The specimen is placed face down at an angle of 30 degrees and exposed to the open flame of a bunsen burner located at the lower face of the test specimen.

Estimated Time:

Elapsed Time=2 days

Results: Flame Spread Rating.

Taber Abrasion Test

References: TM 191

Purpose: To obtain the resistance of a given material to abrasion.

Sample: Submit one 4.5" diameter disc; Die Cut. (drill ¼" diameter hole in the center of hard materials.)

Test parameters:

Number of revolutions (standard=1000 rev).

Weight (250, 500, or 1000 grams) (uniform between samples).

Type of abrasive wheel (uniform between samples).

Estimated Time:

Elapsed Time=15 min/material (based 1000 revolutions).

Results:

Weight Loss (reported in grams lost).

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An aqueous composition comprising:
   A. at least one water soluble polyamidoamine-epihalohydrin polymer having at least one functional group capable of under going crosslinking with another component A polymer upon heating or drying of the composition; and
   B. at least one water-insoluble film forming latex polymer;

wherein the ratio of A to B is from about 5:1 to 1:1 based on dry weight of A and B.

2. The composition of claim 1 wherein the functional group of component A comprises azetidinium.

3. The composition of claim 1 wherein component B comprises a polymer derived from a vinyl halide and an alkene.

* * * * *

UNITED STATES PATENT AND TRADEMARK OFFICE
CERTIFICATE OF CORRECTION

PATENT NO. : 6,586,520 B1
DATED : July 1, 2003
INVENTOR(S) : J. Canorro et al.

It is certified that error appears in the above-identified patent and that said Letters Patent is hereby corrected as shown below:

<u>Title page,</u>
Item [75], Inventors, should read as follows:

-- James Canorro, East Syracuse, NY;
       Matthew B. Howle, Hockessin, DE;
       Kevin M. Mottern, Midland, PA
       William Rodriguez, Newark, DE;
       Jennifer E. Steed, Pensacola, FL --.

Signed and Sealed this

Twenty-second Day of June, 2004

JON W. DUDAS
*Acting Director of the United States Patent and Trademark Office*